US012590380B2

(12) United States Patent
Ma et al.

(10) Patent No.: US 12,590,380 B2
(45) Date of Patent: Mar. 31, 2026

(54) ELECTRODEPOSITION OF PURE PHASE SnSb FROM EUTECTIC ETHALINE SOLUTION FOR SODIUM-ION AND LITHIUM-ION BATTERY ANODES

(71) Applicant: COLORADO STATE UNIVERSITY RESEARCH FOUNDATION, Fort Collins, CO (US)

(72) Inventors: Jeffrey Ma, Fort Collins, CO (US); Amy L. Prieto, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 0 days.

(21) Appl. No.: 17/317,562

(22) Filed: May 11, 2021

(65) Prior Publication Data

US 2021/0348292 A1 Nov. 11, 2021

Related U.S. Application Data

(60) Provisional application No. 63/023,145, filed on May 11, 2020.

(51) Int. Cl.
*C25D 3/30* (2006.01)
*C25D 3/34* (2006.01)
(Continued)

(52) U.S. Cl.
CPC ............... *C25D 3/30* (2013.01); *C25D 3/34* (2013.01); *H01M 4/0452* (2013.01); (Continued)

(58) Field of Classification Search
CPC . C25D 3/66; C25D 3/665; C25D 5/00; C25D 5/617
(Continued)

(56) References Cited

U.S. PATENT DOCUMENTS

2005/0199506 A1* 9/2005 Toben ...................... C25D 3/32
                                                    205/253
2016/0102413 A1* 4/2016 Okada ...................... C25D 3/60
                                                    205/125
(Continued)

FOREIGN PATENT DOCUMENTS

JP        2000219993 A * 8/2000 ............... C25D 3/30

OTHER PUBLICATIONS

Yang et al., "Electrodeposition of Tin and Antimony in 1-Ethyl-3-Methylimidazolium Tetrafluoroborate Ionic Liquid," Journal of Applied Electrochemistry (Apr. 2008), vol. 38, pp. 537-542. (Year: 2008).*

(Continued)

*Primary Examiner* — Edna Wong
(74) *Attorney, Agent, or Firm* — Samuel M. Freund; Cochran Freund & Young LLC

(57) ABSTRACT

A method for electrodeposition of pure phase crystalline SnSb from deep eutectic ethaline is described. Thin films of SnSb were synthesized using a solution containing equimolar Sn(II) and Sb(III) chlorides as precursors, and ethaline (1:2 by weight of choline chloride and ethylene chloride) was used as the solvent for the electrodeposition solution. The purity of the product is important, as the impure phase is found to be detrimental to the material's lifetime as both a sodium-ion and a lithium-ion anode. For sodium-ions, the directly deposited electrode was able to retain 95% capacity after 300 cycles, and only fall below 80% capacity retention after 800 cycles when cycled versus sodium. The electrodeposited SnSb used as a Li-ion battery anode showed stability, only falling below 80% capacity retention after 400 cycles.

18 Claims, 23 Drawing Sheets

(51) Int. Cl.

| | |
|---|---|
| *H01M 4/04* | (2006.01) |
| *H01M 4/36* | (2006.01) |
| *H01M 4/38* | (2006.01) |
| *H01M 10/0525* | (2010.01) |
| *H01M 10/36* | (2010.01) |

(52) U.S. Cl.
CPC ........... *H01M 4/366* (2013.01); *H01M 4/387* (2013.01); *H01M 10/0525* (2013.01); *H01M 10/36* (2013.01)

(58) Field of Classification Search
USPC ................ 205/238, 252, 253, 230, 234, 236
See application file for complete search history.

(56) References Cited

U.S. PATENT DOCUMENTS

2019/0368063 A1* 12/2019 Yamaguchi .............. C25D 3/60
2020/0208285 A1* 7/2020 Enomoto ................. C25D 3/60

OTHER PUBLICATIONS

Ma et al., "Electrodeposition of Pure Phase SnSb Exhibiting High Stability as a Sodium-Ion Battery Anode," Chemical Communications (2019), vol. 55, No. 48, pp. 6938-6941. (Year: 2019).*

Medvedev et al., "The Electrodeposition of Tin-Antimony Alloy from a Dilute Sulfate Electrolyte with Organic Additives," Protection of Metals (Jul. 2000), vol. 36, No. 4, pp. 385-387. (Year: 2000).*

Su et al., "Electrochemical Preparation of Sub-Micrometer Sn—Sb Alloy Powder in ChCI-EG Deep Eutectic Solvent," Int. J. Electrochem. Sci. (Apr. 1, 2016), vol. 11, pp. 3325-3338. (Year: 2016).*

International Search Report and Written Opinion, for "Electrodeposition of Pure Phase SnSb From Eutectic Ethaline Solution for Sodium-Ion and Lithium-Ion Battery Anodes", PCT/US21/31836, mailed Aug. 20, 2021, 8 pages.

Yang, Wenzhong, et al, "Electrodeposition of tin and antimony in 1-ethyl-3 methylimidazolium tetrafluoroborate ionic liquid", J Appl. Eletrochem (2008) 38:537-542, 6 pages.

W.T. Jing, et al, "Recent Progress on metallic Sn- and Sb-based anodes for sodium-ion batteries", J. Mat. Chem, A, DOI: 10.1039/ C9TA11782B; published online Jan. 16, 2020, 69 pages.

Park et al., "A mechano-and electrochemically controlled SnSb/C nanocomposite for rechargeable Li-ion batteries", Eletrochemica Acta: vol. 54, pp. 6367-6373; Jun. 10, 2009, 7 pages.

Ma et al., "Electrodeposition of pure phase SnSb exhibiting high stability as a sodium-ion battery anode", Chem. Commun, vol. 55, pp. 6938-6941; May 8, 2019, 4 pages.

He et al., "Antimony-based materials as promising anodes for rechargeable lithium-ion and sodium-ion batteries", Materials Chemistry Frontiers, 2, pp. 437-455, Dec. 12, 2017 (Dec. 12, 2017).

He et al., "A solid-electrolyte-reinforced separator through single-step electrophoretic assembly for safe high-capacity lithium ion batteries", Journal of Power Sources 448 (2020) 227469.

* cited by examiner

ELECTRODEPOSITION OF PURE PHASE SnSb FROM EUTECTIC ETHALINE SOLUTION FOR SODIUM-ION AND LITHIUM-ION BATTERY ANODES

CROSS-REFERENCE TO RELATED APPLICATIONS

The present application claims the benefit of U.S. Provisional Patent Application Number 63/023,145 for "Electrodeposition Of Pure Phase SnSb From Eutectic Ethaline Solution" which was filed on 11 May 2020, the entire content of which Patent Application is hereby specifically incorporated by reference herein for all that it discloses and teaches.

GOVERNMENT SUPPORT CLAUSE

This invention was made with government support under NSF-SSMC-1710672 awarded by the National Science Foundation. The government has certain rights in the invention.

BACKGROUND

Energy storage will be of importance for the foreseeable future, with the increased demand for electric vehicles and automakers committed to turning cars into all electric vehicles. Secondary batteries play a major role in energy storage as the world slowly transitions from non-renewable sources, such as fossil fuels, to cleaner and more sustainable storage methods. Currently, graphite is commercially used as the anode for a majority of lithium-ion batteries and saturates the market, although silicon is slowly beginning to push into commercial industries. Current battery technology can be improved by replacing current graphite anodes because these anodes have low gravimetric capacity that results from only being able to hold one lithium for every six carbon atoms. Alloy materials have been studied as a potential anode replacements for commercial graphite anodes due to their greater volumetric and gravimetric capacities when compared to graphite. Alloy anodes have two to ten times the theoretical gravimetric capacity of graphite due to their ability to react with multiple lithium per metal center. One such alloy material, SnSb, has been heavily researched and has been found as a promising material to potentially replacing graphite.

Of the secondary battery technologies, lithium-ion batteries are presently utilized in applications ranging from portable devices to all-electric vehicles. In recent years there has been an increase in the research on sodium-ion batteries as a substitute for lithium-ion in certain technologies, such as large grid storage. This is due to sodium's higher abundance and low cost. Graphite, the traditional anode material for lithium-ion batteries, graphite, does not perform well as a sodium-ion anode, because of the larger size of Na$^+$ ions when compared to Li$^+$ ions, which makes graphite not a compatible host. There is thus a need for optimal Na-ion anodes that can exhibit high capacity and long cycle life. Currently, most investigations on sodium anode materials involve hard carbon. However, hard carbon exhibits poor cycling performance and can result in the plating and dendritic growth of sodium metal on the surface, which is a safety hazard.

SUMMARY

In accordance with the purposes of the present invention, as embodied and broadly described herein, an embodiment of the method for electrodeposition of SnSb on a substrate, hereof, includes: preparing a solution containing Sn(II) and Sb(III) salts in a nonaqueous solvent; inserting a conducting metal substrate into the solution; and applying a potential more negative than –0.55 V vs. Ag/Ag$^+$ to the conducting metal substrate for sufficient time to form a thin film of SnSb thereon.

In another aspect of the present invention and in accordance with its purposes, as embodied and broadly described herein, an embodiment of the method for forming a high stability sodium-ion battery anode, hereof, includes: preparing a solution containing Sn(II) and Sb(III) salts in a nonaqueous solvent; inserting a conducting metal substrate into the solution; and applying a potential more negative than –0.55 V vs. Ag/Ag$^+$ to the conducting metal substrate for sufficient time to form a thin film of SnSb thereon.

In yet another aspect of the present invention and in accordance with its purposes, as embodied and broadly described herein, an embodiment of the method for forming a high stability lithium-ion battery anode, hereof, includes: preparing a solution containing Sn(II) and Sn(III) salts in a nonaqueous solvent; inserting a conducting metal substrate into the solution; and applying a potential more negative than –0.55 V vs. Ag/Ag$^+$ to the conducting metal substrate for sufficient time to form a thin film of SnSb thereon.

Benefits and advantages of the present invention include, but are not limited to, providing a method for electrodeposition of pure phase SnSb on a conducting metal substrate using an ethaline solution, for use as a sodium-ion battery anode or a lithium ion battery anode, without the need for binders, carbon additives, or post-processing.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIGS. 3A-3C are graphs of differential capacity of electrodeposited Sb, Sn, and SnSb, respectively, showing the first two cycles, while

FIG. 5A is a graph of galvanostic cycling of electrodeposited SnSb, Sn, and Sb between 0.01 V and 1.5 V at C/2 rate, while

FIGS. 6A to 6C are graphs of the differential capacity for Sb, SnSb, and Sn during their first two cycles, respectively, while

FIGS. 8A to 8D show depositions with different quantities of Sn:SnSb, with FIGS. 8A and 8B showing XRD patterns of differential capacity, while FIG. 8C is a graph of the galvanostatic cycling for potentials between 0.01 V and 1.5 V in a lithium half-cell, and FIG. 8D is a graph summarizing the galvanostatic cycling data for electrodes falling below 80% retained capacity, based on the second cycle.

DETAILED DESCRIPTION

Figures 1A, 1B, 1C:
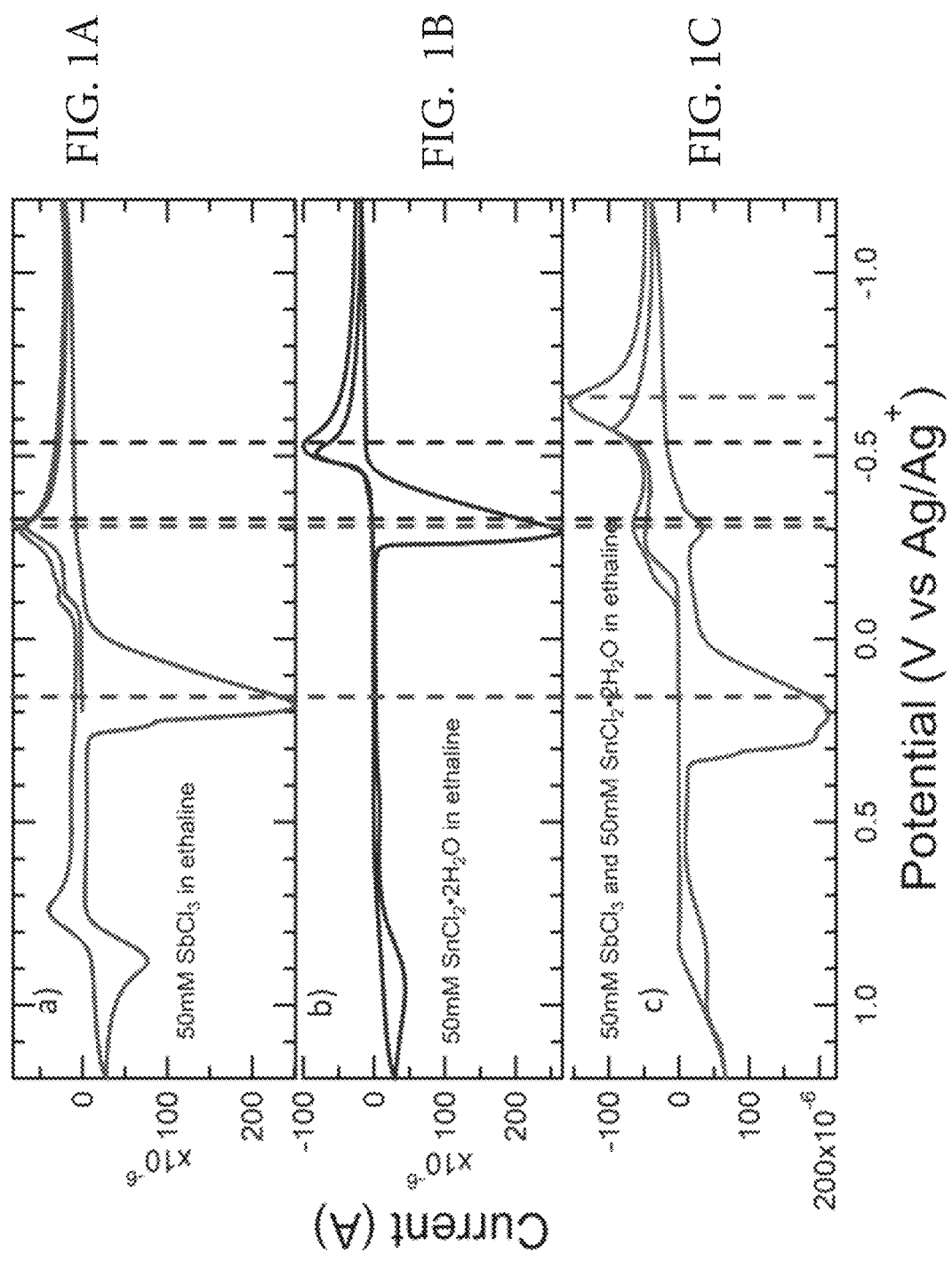
FIG. 1A is a cyclic voltammogram of 50 mM SnCl$_2$·2H$_2$O in ethaline.
FIG. 1B is a cyclic voltammogram of 50 mM SbCl$_3$ in ethaline.
FIG. 1C is a cyclic voltammogram of 50 mM SnCl$_2$·2H$_2$O and 50 mM SbCl$_3$ in ethaline combined, where an Ag wire reference and Pt working electrode were used at a scan rate of 50 mV/s.

The motivation in studying alloy anode materials is their greater volumetric and gravimetric capacities when compared to hard carbon. Silicon, while shown to be promising as a lithium-ion battery due to its high theoretical capacity, has demonstrated a lack of ability to store sufficient amounts of sodium. Of all the potential alloy anode materials, Sn (847 mAh/g) and Sb (660 mAh/g) have been heavily studied due to their large theoretical capacities. Intermetallic alloys, like SnSb, have smaller volume expansions upon sodiation, resulting in longer cycle life and improved rate performances. Previous reports on SnSb have suggested that polycrystalline SnSb reforms upon cycling in lithium-ion batteries, which may have some benefits in terms of its mechanical properties. Due to the inability to directly transfer knowledge of anode research from lithium-ion to sodium-ion technology, that is, Si and graphite, SnSb has become a frontrunner for potential application as a sodium-ion battery anode. Ultimately, the goal is to develop an easy and scalable synthesis method with control over the composition, morphology, and surface area of the SnSb anode material, while enhancing its performance.

The bimetallic SnSb alloy has been previously synthesized using methods such as ball milling, electrospinning, hot injection, chemical reduction, solvothermal, and through traditional solid-state means. Most of these methods require higher temperatures, which can cause heterogeneous products given the difference in vapor pressure between the two elements. All of these synthetic methods produce powders as their product, resulting in the need for binders for testing the active materials electrochemically in a battery. Embodiments of the present invention describe the direct electrodeposition of SnSb onto a conducting substrate at room temperature, without the need of additional binders or post processing. Electrodeposition enables control of the composition, particle size, and thickness of the material. While the first Sn—Sb lithium anode reported was synthesized by electrodeposition, pure phase SnSb has never been reported using this process. The most common impurities in previous reports are Sn, Cu$_2$Sb, Cu$_3$Sn, and SnO. All of these impurities are electrochemically active. As a result, the electrodeposition of pure phase SnSb is desired in order to study how the pure phase material interacts with other components in the battery during electrochemical cycling. Pure phase SnSb has been synthesized by electrodeposition using a deep eutectic solvent. Pure SnSb electrodes exhibit competitive gravimetric capacities compared to carbon with binder additives, while maintaining long cycle life in sodium-ion and lithium-ion batteries.

Electrodeposition is a scalable process utilized to synthesize materials in a wide variety of applications including energy storage, in batteries and capacitors, energy production, using photo-electrochemistry and thermoelectric, and through the production of coatings for corrosion resistance. This process is specifically of interest for battery application as it allows for growth outside of planar substrates, enabling the growth of high surface area, 3D architectures electrodes. Although electrodeposition was the first reported synthesis used for the creation of the Sn—Sb alloy system to test as a material for secondary batteries, the synthesis of pure phased SnSb through electrodeposition was only recently reported.

Prior reported electrodeposition using aqueous solutions have resulted in tin rich products with crystalline tin impurities present in the product. The present synthesis of SnSb uses ethaline, a deep eutectic solvent, a eutectic mixture having lower melting point than its individual components. This solvent is of interest due to the suitable electrochemical window for the synthesis, the cheap and easily obtainable materials of choline chloride and ethylene glycol that make up this solvent, and the biodegradability of the solvent. Ethaline also allows for direct and single-step electrodeposition of the targeted species with minimal side reaction occurring within the solution.

Other suitable nonaqueous solvents may include ethylene glycol, choline chloride, urea, thiourea, glycerol, malonic acid, benzoic acid, and oxalic acid, and mixtures thereof.

Reference will now be made in detail to the present embodiments of the invention, examples of which are illustrated in the accompanying drawings. It will be understood that the FIGURES are presented for the purpose of describing particular embodiments of the invention and are not intended to limit the invention thereto.

Thin films of SnSb were synthesized using a solution containing Sn(II) and Sb(III) chlorides as precursors, and ethaline (1:2 molar ratio of choline chloride (both Aldrich, purity>98% and VWR, high purity were used) to ethylene glycol (Fisher Scientific)) was used as the solvent for this electrodeposition solution. Baths used for the electrodeposition of Sn and Sb included 50 mM SbCl$_3$ (Sigma Aldrich, ACS reagent) and 50 mM SnCl$_2$·2H$_2$O (Sigma Aldrich, ACS reagent) dissolved in ethaline, respectively. Choline chloride was heated at reflux in absolute ethanol (Pharmaco, 200 Proof) on a hotplate and recrystallized prior to use. The crystals were then filtered and dried in a vacuum oven at 100° C. The solution containing 50 mM SbCl$_3$ and 50 mM SnCl$_2$·2H$_2$O in ethaline was typically heated at 70° C. until the solution became homogenous and clear. Electrodeposition was conducted from the baths in a three-electrode setup using a Chi 660C Potentiostat (CH Instrument) with a platinum mesh counter electrode (100 mesh, Alfa Aesar), silver wire reference electrode, and nickel foil as the working electrode. Nickel foil was cleaned in 0.1 M nitric acid for 30 s prior to deposition. Kapton© tape was placed on the back of the different foils to allow for deposition to only occur on one side of the film with a controlled surface area. Single step electrodepositions were performed at 25° C. with a constant potential of −0.7 V vs Ag/Ag$^+$. Electrochemical studies were performed using electrodepositions performed for 60 s.

Other suitable precursor materials containing tin or antimony may include tin and antimony sulfates, antimony oxide ($Sb_2O_3$), citrate salts of tin and antimony, and salts of tin and antimony reactions with gluconic acid and tartaric acid, and mixtures thereof.

Cyclic voltammetry (CV) was conducted using a three electrode apparatus, where the working electrode was platinum (BASi, 1.6 mm diameter), the counter electrode was a platinum mesh (100 mesh, Alfa Aesar), and the reference electrode was a silver wire. CVs were conducted within the range of −1.2 V to 1.2 V vs Ag/Ag$^+$ at varying scan rates. The solution was studied using direct analysis real time mass spectrometry (DART-MS; Bruker MaXis QTOF with Ion-Sense DART-SVP and Agilent TOP LCMS with Ion Sense DART-100 were used). DART-MS was prepared in negative ion mode and spectra were calibrated using Fombin Y as standard. The surface of the electrode was studied by scanning electron microscopy (SEM; JOEL JSM-6500F operating at 15 kV). Complementary to this technique, energy-dispersive X-ray spectroscopy (EDS) was used to obtain spectra and analyzed using Aztec software (Oxford Instrument) to calculate the composition and identify the atomic makeup of the electrodeposited films. The crystalline structures present on the electrodeposited electrodes were identified using conventional X-ray diffraction (XRD; Bruker D8 Discover DaVinci, Cu Kα radiation, λ=1.54184 Å) and glancing angle X-ray diffraction (GAXRD; Bruker D8 Discover Series 1, Cu Kα radiation, λ=1.54184 Å).

Figure 1D:
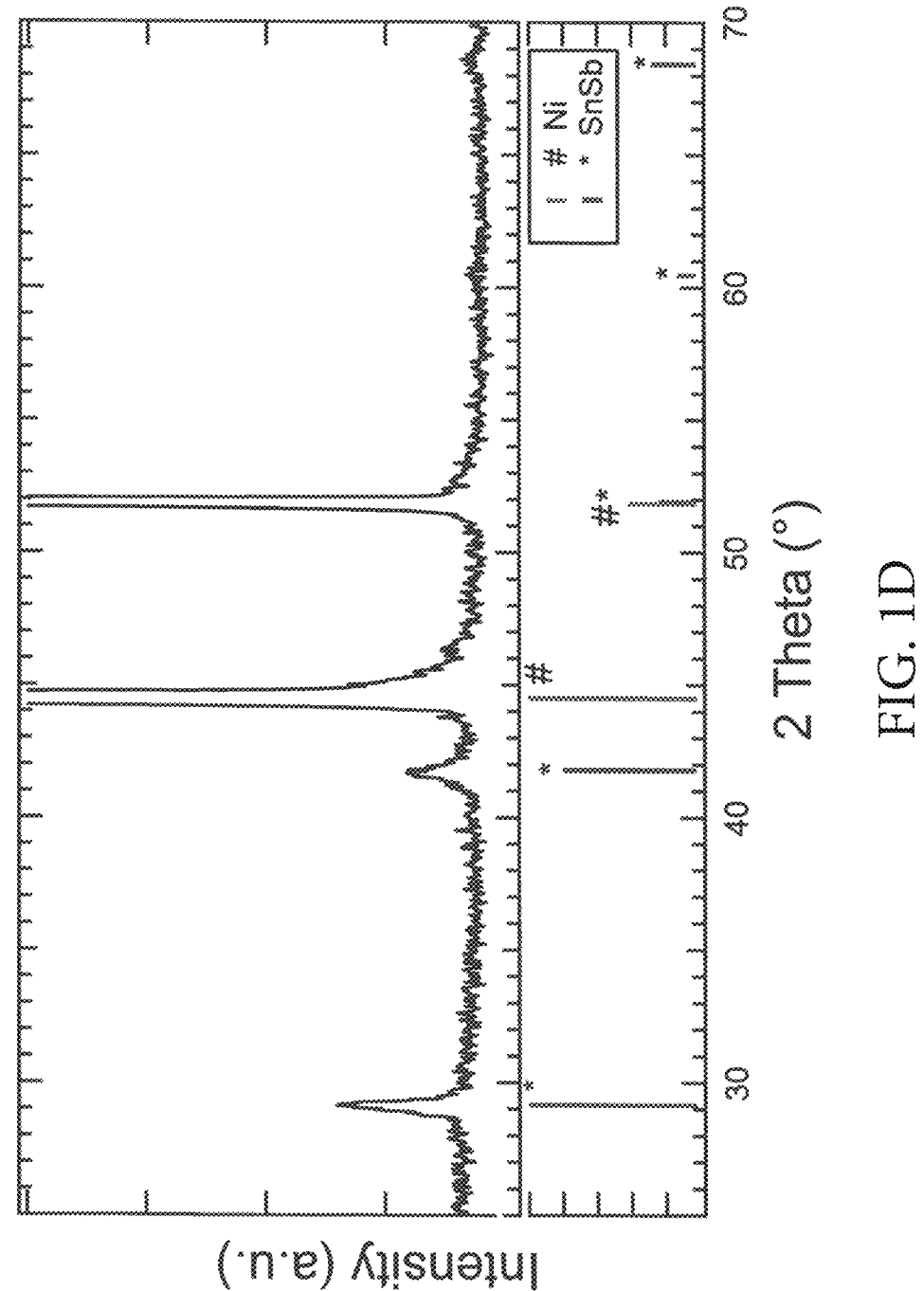
FIG. 1D is an X-Ray Diffraction (XRD) scan of SnSb electrodeposited onto a nickel substrate.

Turning now to FIGS. 1A and 1B, cyclic voltammetry of the individual tin and antimony in ethaline solutions are shown, respectively, and the cyclic voltammetry of the solution containing both tin and antimony in ethaline shown in FIG. 1C were examined in order to identify the potential at which co-electrodeposition of the two metals should occur. The cyclic voltammetry of the solution containing both Sn(II) chloride and Sb(III) chloride in ethaline presents two reduction peaks during its first sweep that can be identified based on the cyclic voltammetry of the individual solutions. During the first cathodic sweep, the reduction of Sb$^{3+}$ to Sb$^0$ is present at −0.3 V, and reduction of Sn$^{2+}$ to Sn$^0$ at −0.55 V vs Ag/Ag$^+$. During the reverse sweep of the scan direction, oxidation peaks are present at −0.3 V vs Ag/Ag$^+$ for the stripping of Sn$^0$ into Sn$^{2+}$, and 0.2 V vs Ag/Ag$^+$ for the stripping of Sb$^0$ into Sb$^{3+}$. The more positive potential peaks at approximately 0.9 V vs Ag/Ag$^+$ are believed to be related to the Sb$^{3+}$/Sb$^{5+}$ couple. The reduction of Sb$^{3+}$ to Sb$^0$ at −0.3 V and Sn$^{2+}$ to Sn$^0$ at −0.55 V vs Ag/Ag$^+$ are important data needed for the electrodeposition of SnSb. Due to the more negative reduction potential of tin, co-deposition of Sb and Sn should occur at a potential more negative than −0.55 V vs Ag/Ag$^+$. The deposition potential cannot be −0.3 V vs Ag/Ag$^+$ as the cyclic voltammetry data suggests the stripping of Sn occurs while Sb plates between −0.3 V and −0.45 vs Ag/Ag$^+$. This oxidative current suggests that the stripping of Sn$^0$ into Sn$^{2+}$ is not complete until −0.45 V. Using this data, and through optimization of electrodeposition conditions, SnSb was electrodeposited at −0.7 V vs Ag/Ag$^+$ onto a nickel substrate. The X-ray diffraction (XRD) pattern verifies the formation of only SnSb phase onto the nickel substrate (FIG. 1D). The peaks are identified below the XRD pattern. A nickel substrate was used instead of copper due to possible detrimental migration effects of copper into the active material layer seen in a previous work. A scanning electron microscope equipped with an energy-dispersive spectrometer (SEM-EDS) was used to verify the presence of SnSb.

A. Electrochemical Performance of Pure SnSb as a Sodium-Ion Anode

The electrochemical performance of the thin film SnSb as a sodium-ion anode was investigated using Swagelok half cells. A standard electrolyte of 1 M NaPF$_6$ in dimethyl carbonate (DMC) with 5% by weight fluoroethylene carbonate (FEC) was used for all tested cells. Lifetime cycling studies with greater than 200 cycles are unusual in the Sn—Sb literature, which does not show the overall performance and failure of the material. As shown by the galvanostatic cycling at a C/2 rate, the electrodeposited SnSb has higher stability and better performance than either pure Sn and Sb electrodeposited from ethaline (See DOI: 10.1039/c9cc00001a). During its initial discharge, a significant amount of irreversible capacity loss is observed, which may be related to the formation of a solid-electrolyte interface (SEI) layer between the surface of the electrode and the decomposing electrolyte. However, after the initial cycle, the performance of the material begins to stabilize with a discharge capacity of 548.2 mAh/g on its second cycle. Similar to previous reports, the capacity obtained at around the C/2 rate is found to be in the range of 400-600 mAh/g, which is significantly less than its theoretical capacity (752 mAh/g). It has been hypothesized that this is due to the inability of tin to sodiate completely in SnSb due to a shift to higher overpotentials at this rate. Based on the capacity at the second cycle, electrodeposited SnSb is found to maintain significant stability during cycling (FIG. 2) with 95% capacity retention after 300 cycles (at 520.8 mAh/g) and 90.5% capacity retention after 500 cycles (at 496.1 mAh/g). The SnSb anode retains this stability over many cycles and does not fall below 80% capacity retention until after 800 cycles. This slow decrease in capacity can be connected to continuous volumetric expansion and pulverization, resulting in isolation of active material and growth of SEI on the newly exposed surface. This growth of the SEI will result in slower kinetics and eventual sudden death of the cell. This can be supported with ex-situ SEM images taken of a SnSb electrode after cycling in a sodium-ion half-cell showing a buildup of an organic-like SEI on the electrode surface in later cycles.

Figure 2A:
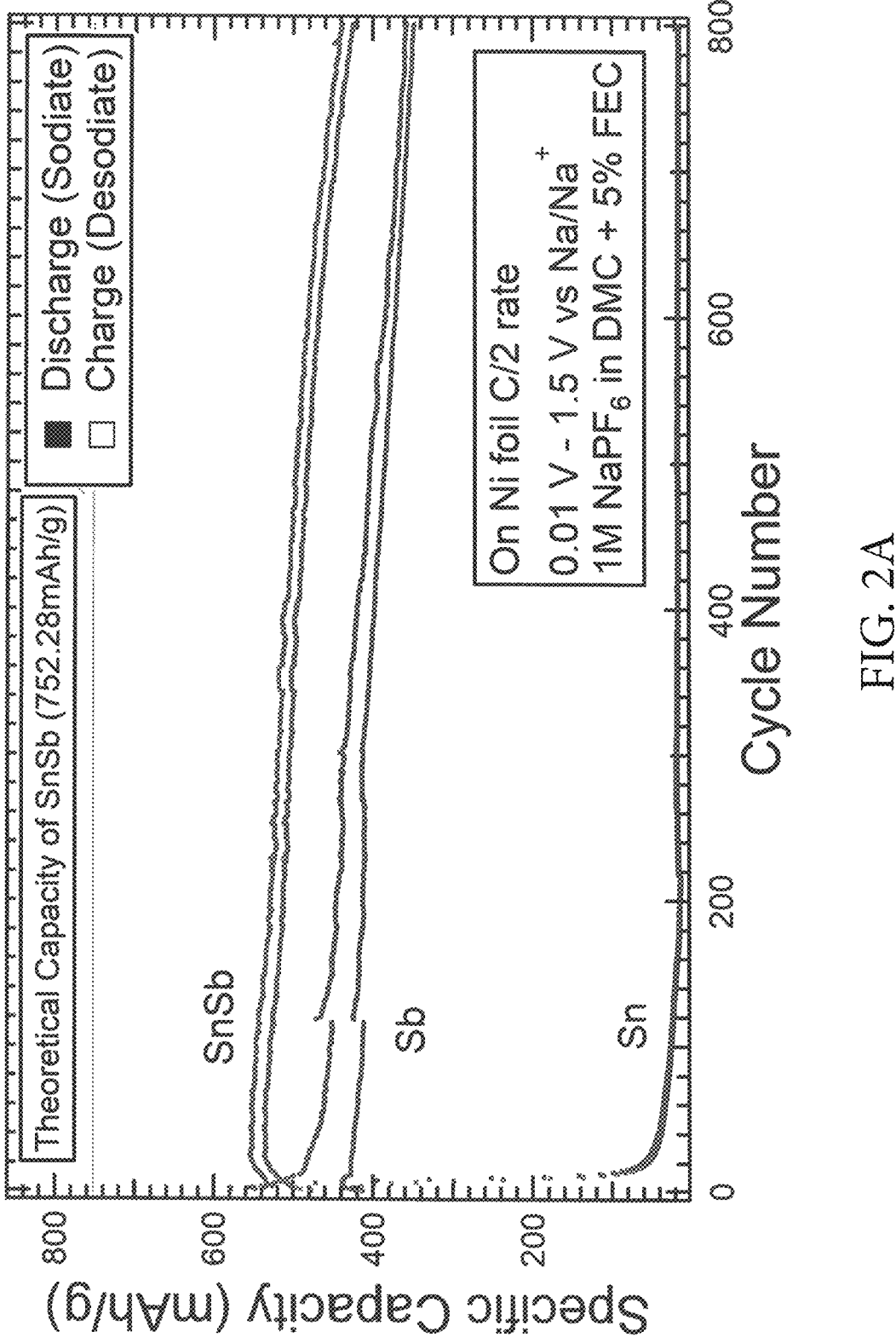
FIG. 2A shows a comparison of electrodeposited SnSb with electrodeposited Sn and Sb from ethaline solution at similar conditions, where the half cells were cycled at a C/2 rate between 0.01 V and 1.5 V vs Na/Na$^+$.
Figure 2B:
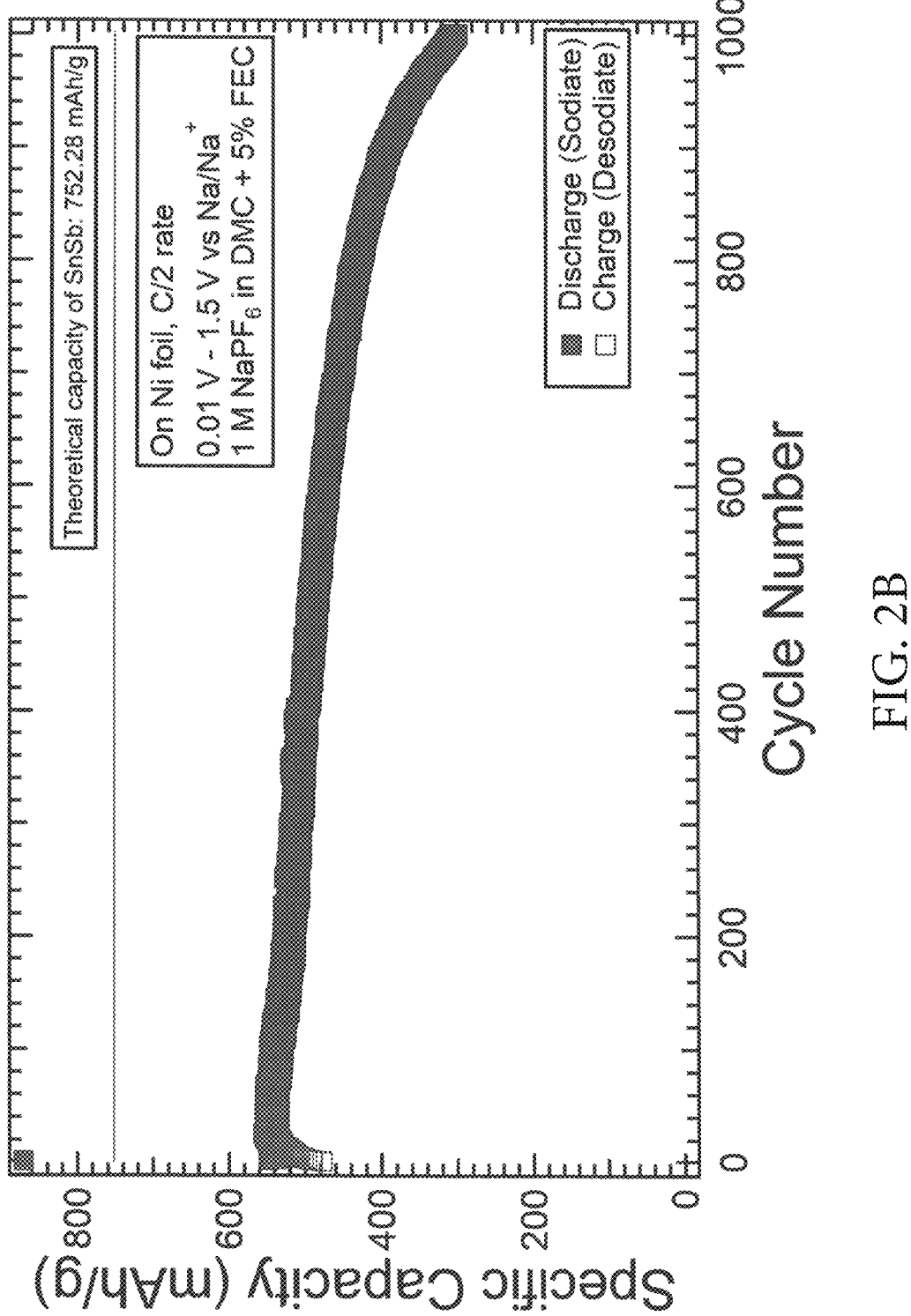
FIG. 2B is a graph showing the electrochemical performance of electrodeposited SnSb, demonstrated by galvanostatically cycling at C/2 rate between the potential window of 0.01 V-1.5 V in a sodium half-cell.
Figure 2C:
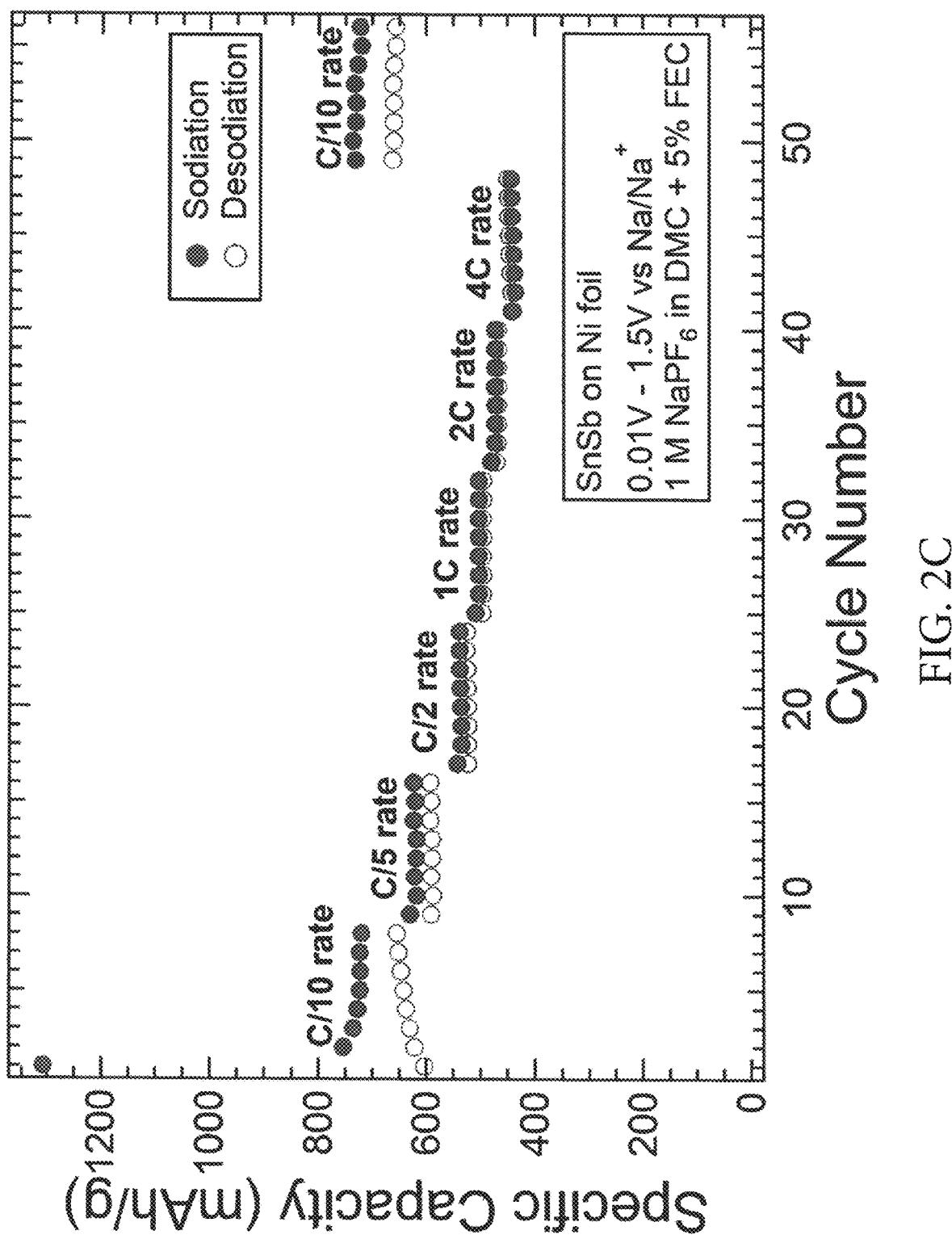
FIG. 2C is a graph showing the rate capability of electrodeposited SnSb at different current rates, demonstrated in a sodium half-cell for 8 cycles at each rate shown in the potential range between 0.01 V and 1.5 V.
Figure 5A:
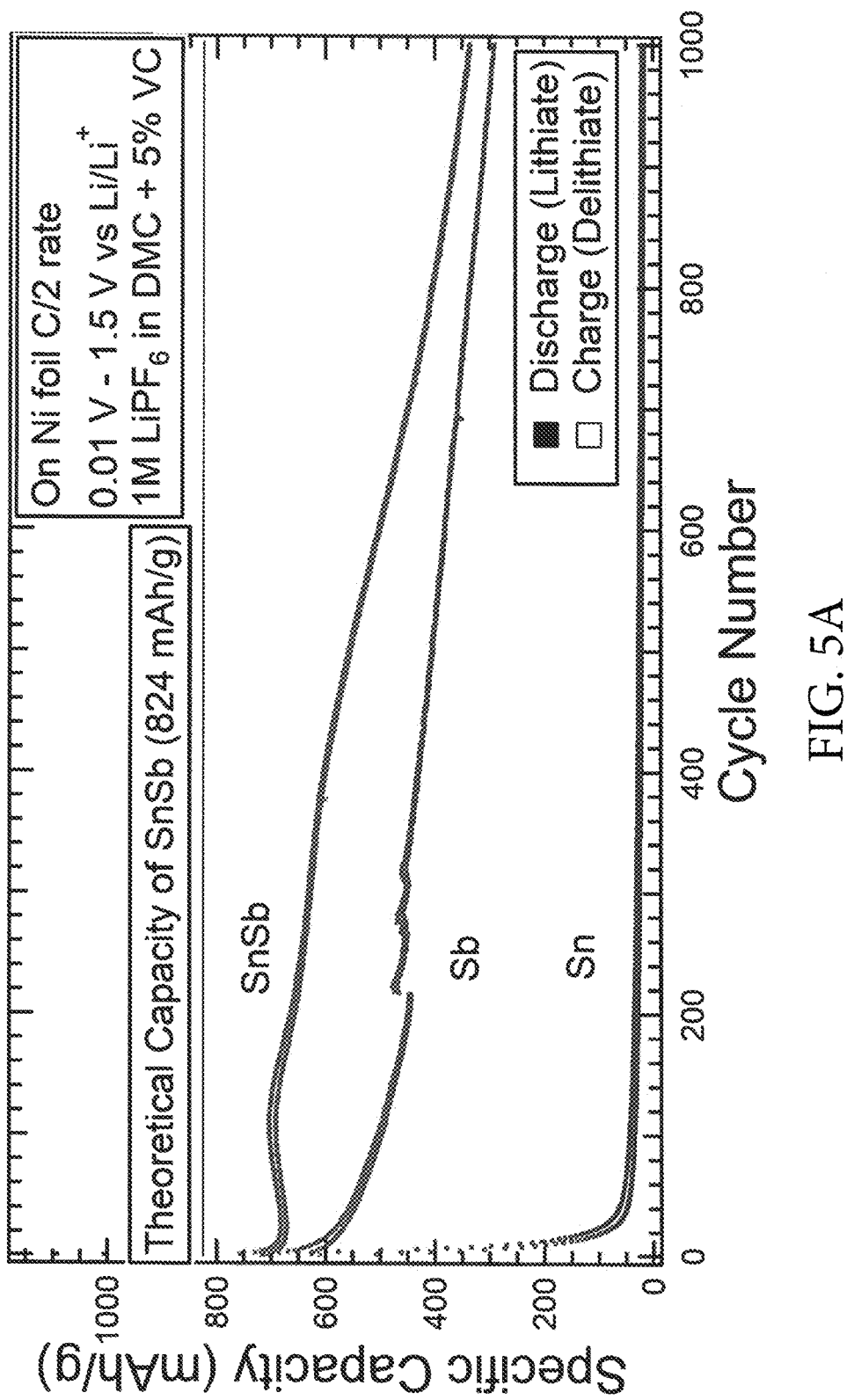

In FIG. 2A, electrodeposited SnSb is compared with electrodeposited Sn and Sb all from ethaline solution at similar conditions. The half cells were cycled at a C/2 rate between 0.01 V and 1.5 V vs Na/Na$^+$. Over the 1000 cycles presented, SnSb was higher in overall capacity than both the Sb and Sn samples. SnSb appears to combine the stability of Sb for long cycling with the higher theoretical capacity of Sn. Rate capability tests were also performed to test the performance of pure SnSb at different current densities (FIGS. 28 and 2C). FIG. 2B is a graph showing the electrochemical performance of electrodeposited SnSb, demonstrated by galvanostatically cycling at C/2 rate between the potential window of 0.01 V-1.5 V in a sodium half-cell, while FIG. 2C is a graph showing the rate capability of electrodeposited SnSb at different current rates, demonstrated in a sodium half-cell for 8 cycles at each rate shown in the potential range between 0.01 V and 1.5 V. The electrodeposited SnSb exhibits specific gravimetric capacities of 720 mAh/g, 620 mAh/g, 540 mAh/g, 500 mAh/g, 472 mAh/g, and 440 mAh/g at C/10, C/5, C/2, 1C, 2C, and 4C, respectively. After cycling at the higher rates, a cycle at C/10 rate shows that the electrode fully recovers with no noticeable drop in capacity, which verifies the stability of the electrode. It should be mentioned that FIG. 2A shows both lithiation and delithiation as filled and unfilled squares; however, due to the large number of data points the squares cannot be distinguished after about 50 cycles for the SnSb. A similar issue exists for FIG. 5A below.

As the rate of charging and discharging of the electrodes is increased, the sodium or lithium reaching the electrode can be diffusion limited, resulting in a lower capacity being stored at higher rates. FIGS. 2C for sodium and 5B (below) for lithium show the quantity of energy stored in SnSb at different rates of charging and discharging as sodium-ion and lithium-ion anodes, respectively. Current is increased after a few cycles to observe how the electrode responds to the faster rates. Charging and discharging at faster rates can also cause stress on the electrode material, resulting in the pulverization of the electrode at high rates in some cases, and the observed drop in capacity. A few cycles of "slow" charging and discharging following the faster rates can demonstrate if this drop in capacity at faster rates is related to the electrode's ability to store energy or if this is due to the mechanical destruction of the electrode, leading to less electrical contact with the active material and less charge stored. If mechanical pulverization of the electrode has occurred, the slow step would not show the capacity that is expected for the "slow" step, and would show a continuous drop in capacity stored in those last few cycles. The graphs indicate only minor mechanical destruction of the electrodes.

Figure 3A:
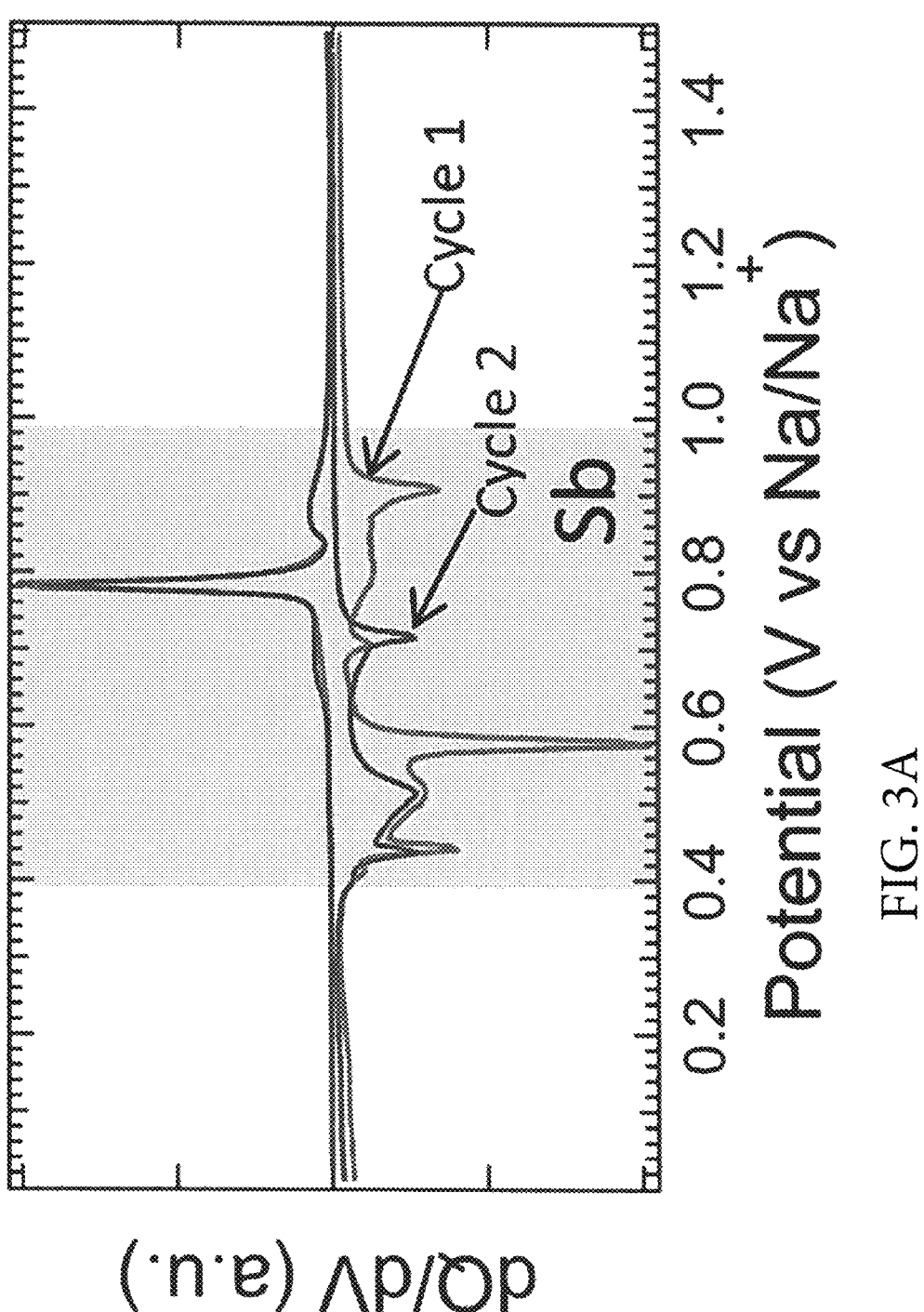
Figure 3B:
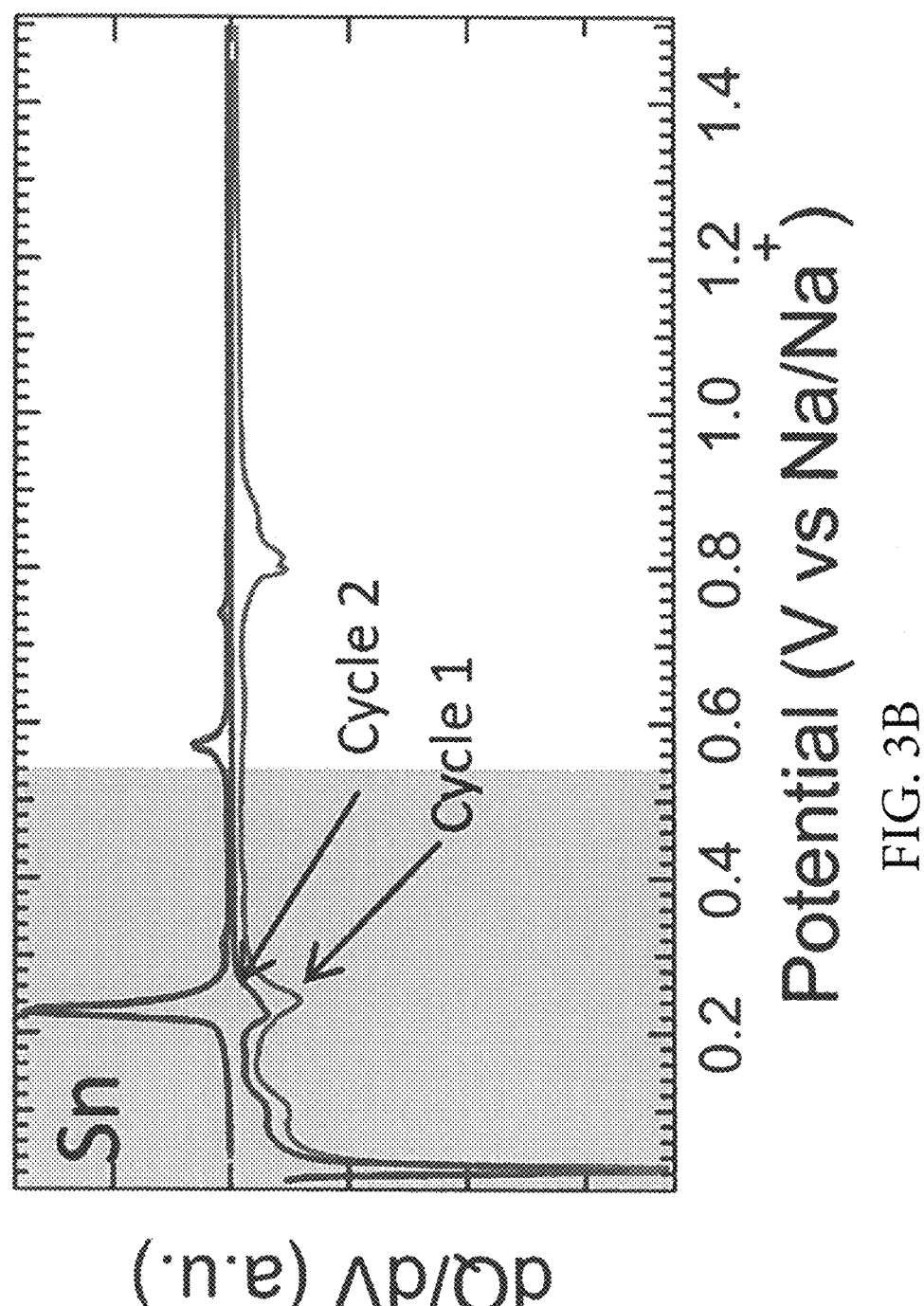
Figure 3C:
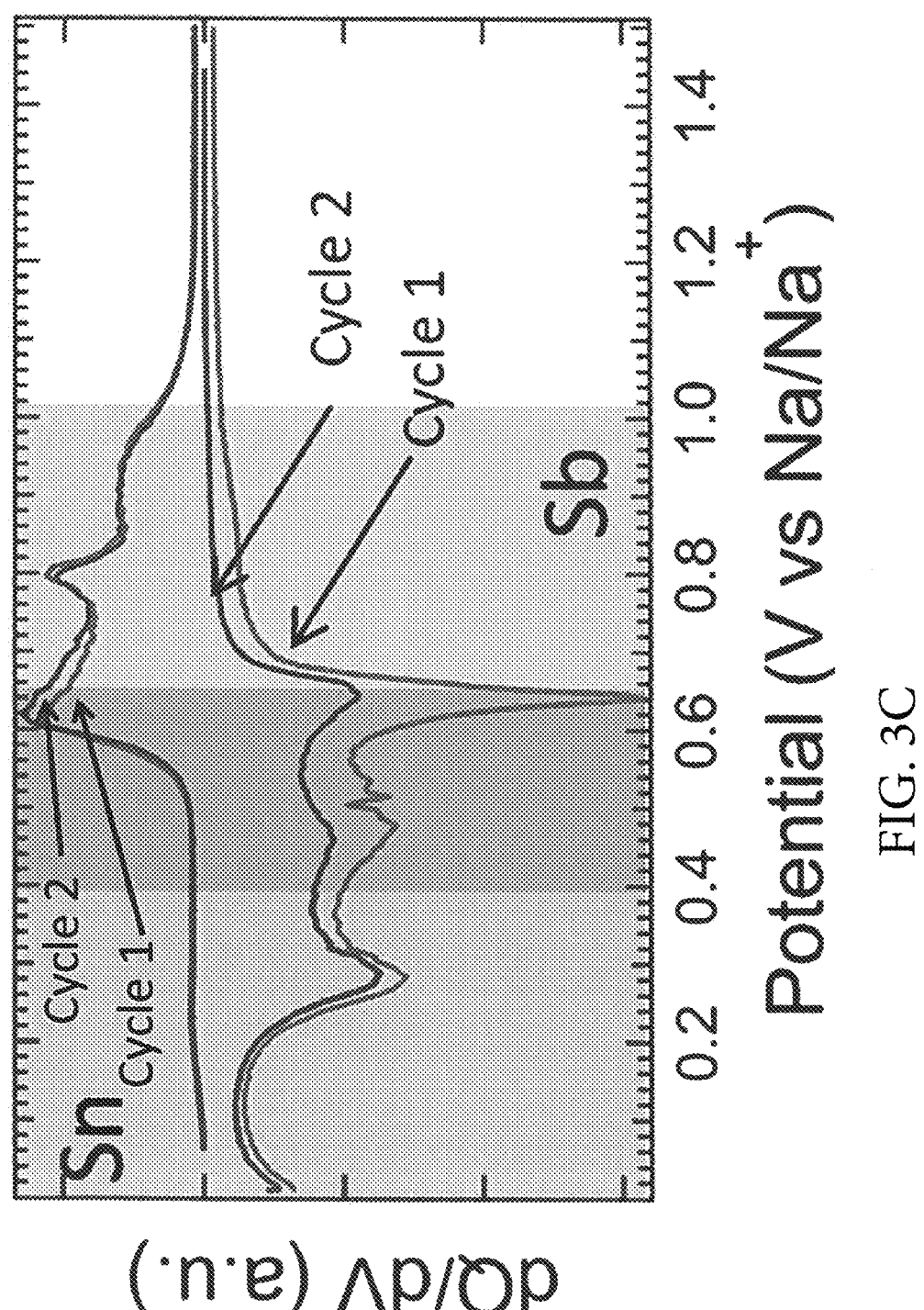

Using the C/2 rate galvanostatic cycling data, differential capacity plots were extracted for pure Sn, Sb, and SnSb phase sampis (FIGS. 3A to 3C). Unlike previous reports for SnSb in lithium-ion batteries, the electrochemistry involved with the sodiation of SnSb is not simply the addition of Sn and Sb sodiation events individually. The sodiation events of SnSb occur at different potentials when compared to the electrodeposited Sn and Sb electrodes individually. Similarly, to previous reports, sodiation events for SnSb are seen at 0.64 V, 0.46 V. and 0.28 V with complementary desodiation events occurring at 0.6 V, 0.8 V, and 0.95 V. The sodiation event seen at ~0.01 V in SnSb when compared to the pure Sn electrode supports the hypothesis from previous reports that the inability of tin to completely sodiate in SnSb may be the reasoning as to why SnSb cannot reach its theoretical capacity at this rate.

Figure 3D:
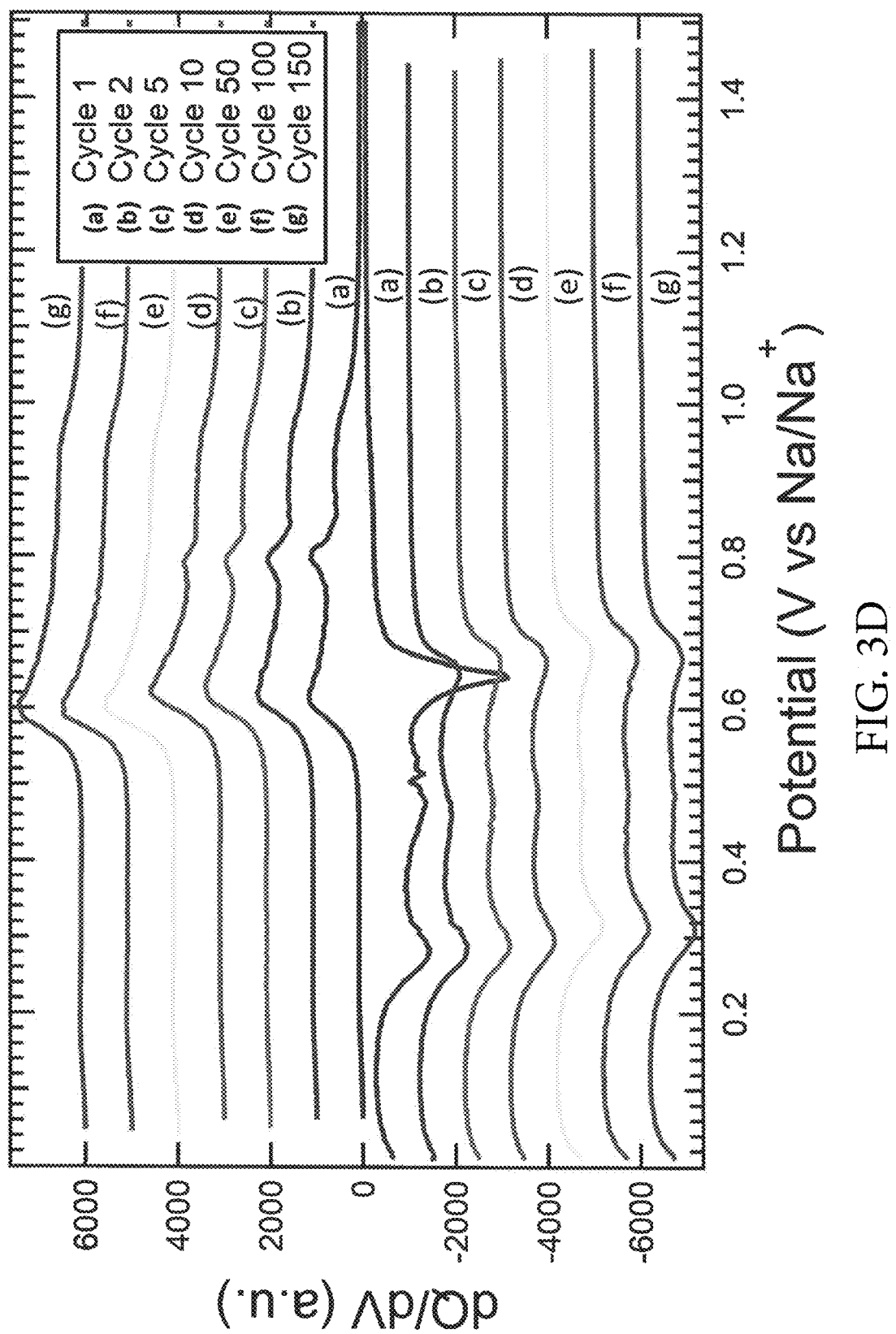
FIGS. 3D and 3E are graphs of the differential capacity of electrodeposited SnSb, and 50:50 Sn:SnSb, respectively, during the first, second, fifth, tenth, fiftieth, one hundredth, and one hundred and fiftieth cycles, obtained from galvanostatically cycling at a C/2 rate, within the range of 1.5 V to 0.01 V vs Na/Na$^+$.
Figure 3E:
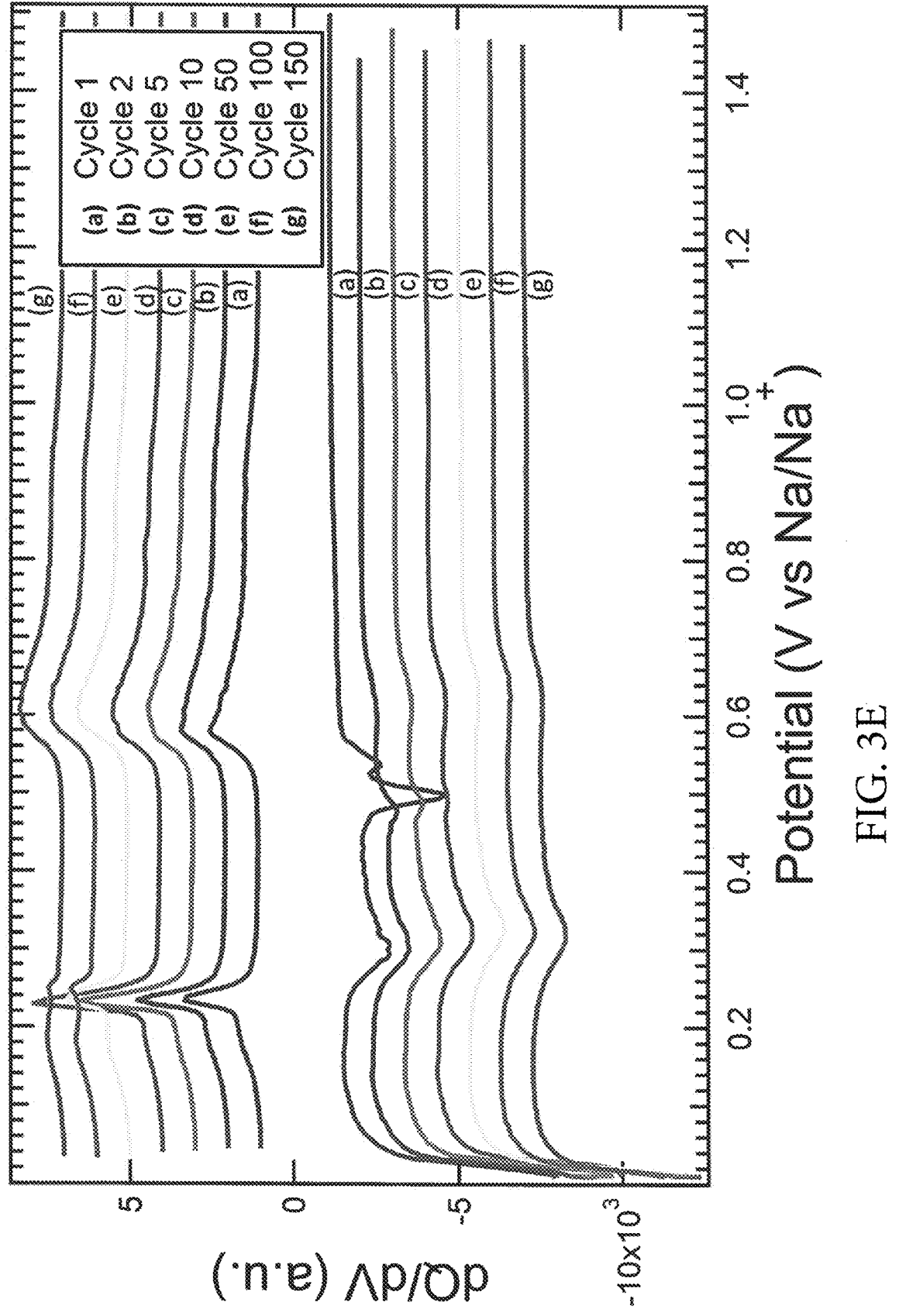

The differential capacity plots also verify the lack of Sn impurity phases present as a result of this synthesis. FIG. 3B shows a sodiation event at about 0.01 V and a desodiation event at about 0.2 V that are sharp and distinct features observed when cycling at this current density in the presence of Sn and not pure phase SnSb. This observation is verified by intentionally introducing Sn impurities in a 50:50 Sn:SnSb electrode (FIG. 3E), where the differential capacity plot presents the defined desodiation event at 0.2 V that is not present over the different cycles at C/2 of pure phase SnSb (FIG. 3D). This suggests introduction of Sn impurities would ultimately increase Sn desodiation activity at 0.2 V to a more defined peak as more Sn is present in this system when cycling at this rate. Galvanostatic cycling of SnSb films containing Sn impurities also suggests that a Sn impurity is detrimental to the electrode's cycle life.

Figure 4:
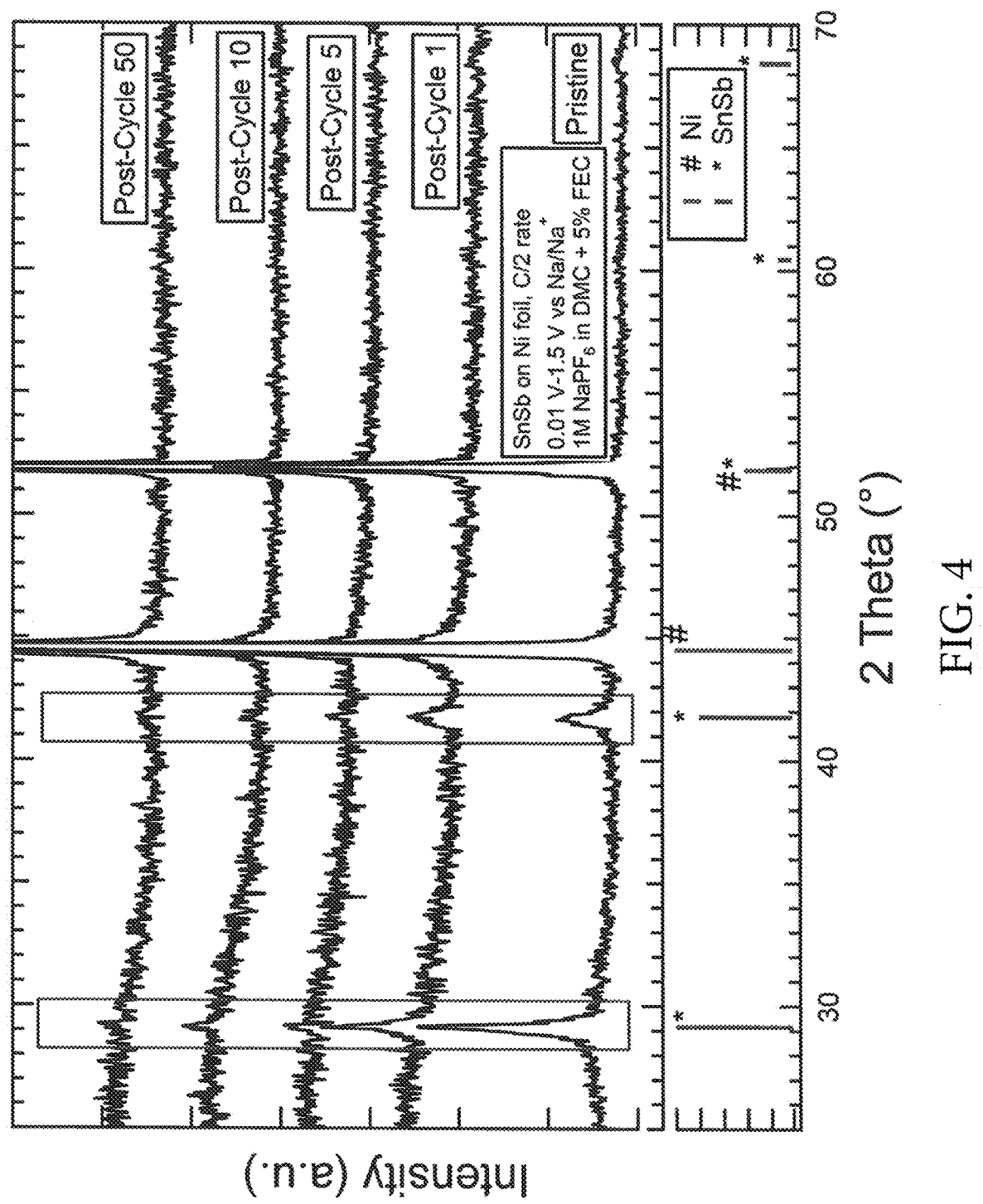
FIG. 4 is a graph of the ex-situ XRD of electrodeposited SnSb galvanostatically cycled at a C/2 rate, within the range between 1.5 V to 0.01 V vs Na/Na$^+$ for the indicated cycle numbers.

Ex-situ XRD data (FIG. 4) shows the reappearance of crystalline SnSb after the first cycle (charging and discharging) at C/2 rate. The Ni and SnSb features in the XRD are identified below the data, and the major peaks are illustrated in the vertical boxes. Previous literature reported the disappearance of the peaks and the formation of amorphous features immediately after the first cycle, which suggests the electrodeposited SnSb does reform, but gradually loses long range order and changes from crystalline SnSb to an amorphous phase with each successive cycle, unlike the immediate transformation observed in previous reports. This observation is similar to what was seen in a previous study of SnSb in lithium-ion batteries where SnSb reforms, but loses long range ordering over cycling. Extended X-ray absorption and fine structure (EXAFS) from a recent report also suggests the reformation of the same SnSb phase with similar Sn and Sb environments after desodiation, but loss of long range ordering based on their data. Transmission electron microscopy (TEM) and electron diffraction from a recent study also support SnSb reformation. Additional experiments were performed verifying the reformation of crystalline SnSb after electrochemical cycling in the present system.

B. Electrochemical Performance of Pure SnSb as a Lithium-Ion Anode

Figure 5B:
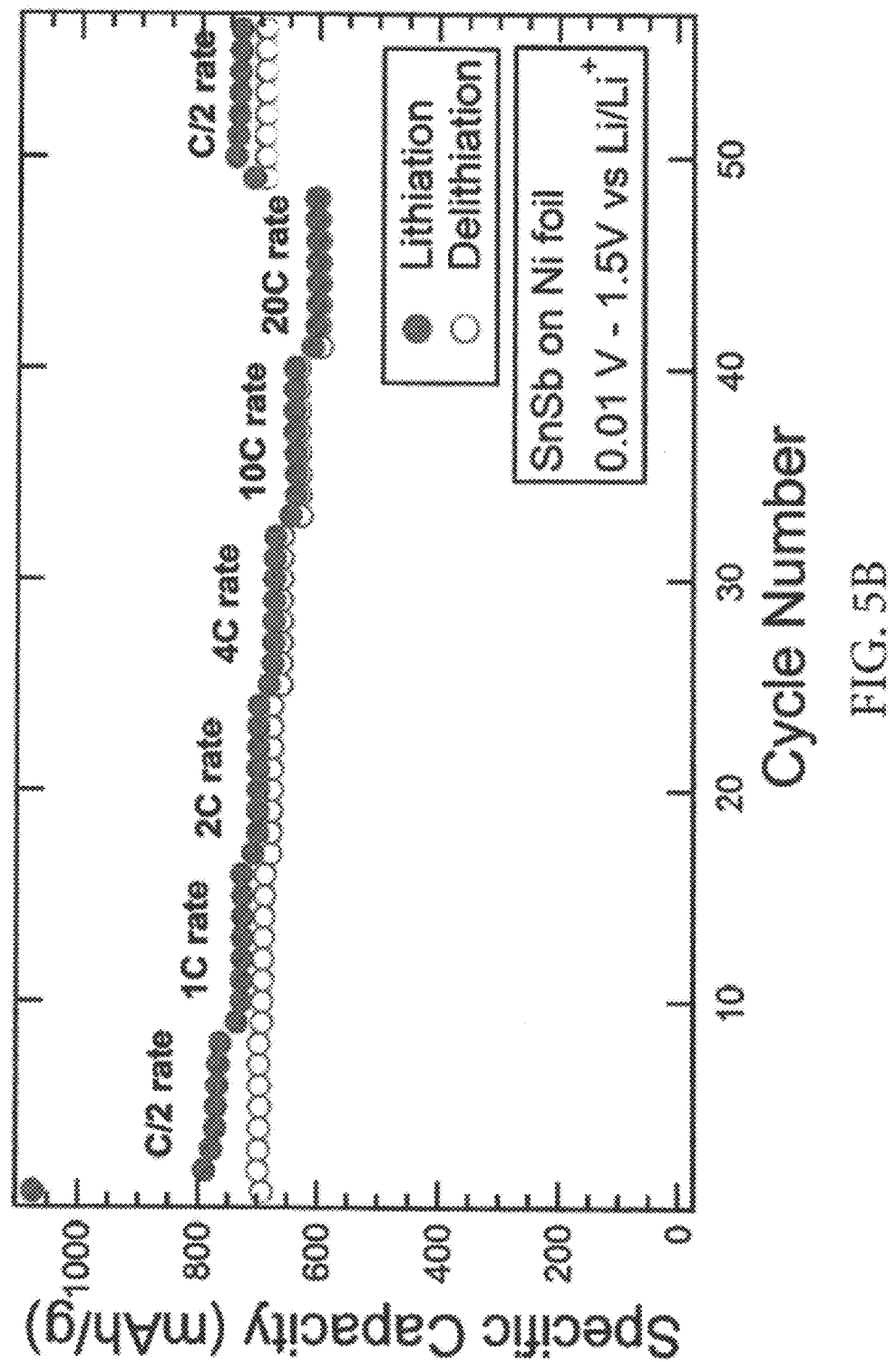
FIG. 5B is a graph of the rate capability of electrodeposited SnSb in a lithium half cell at different current rates.
Figure 6A:
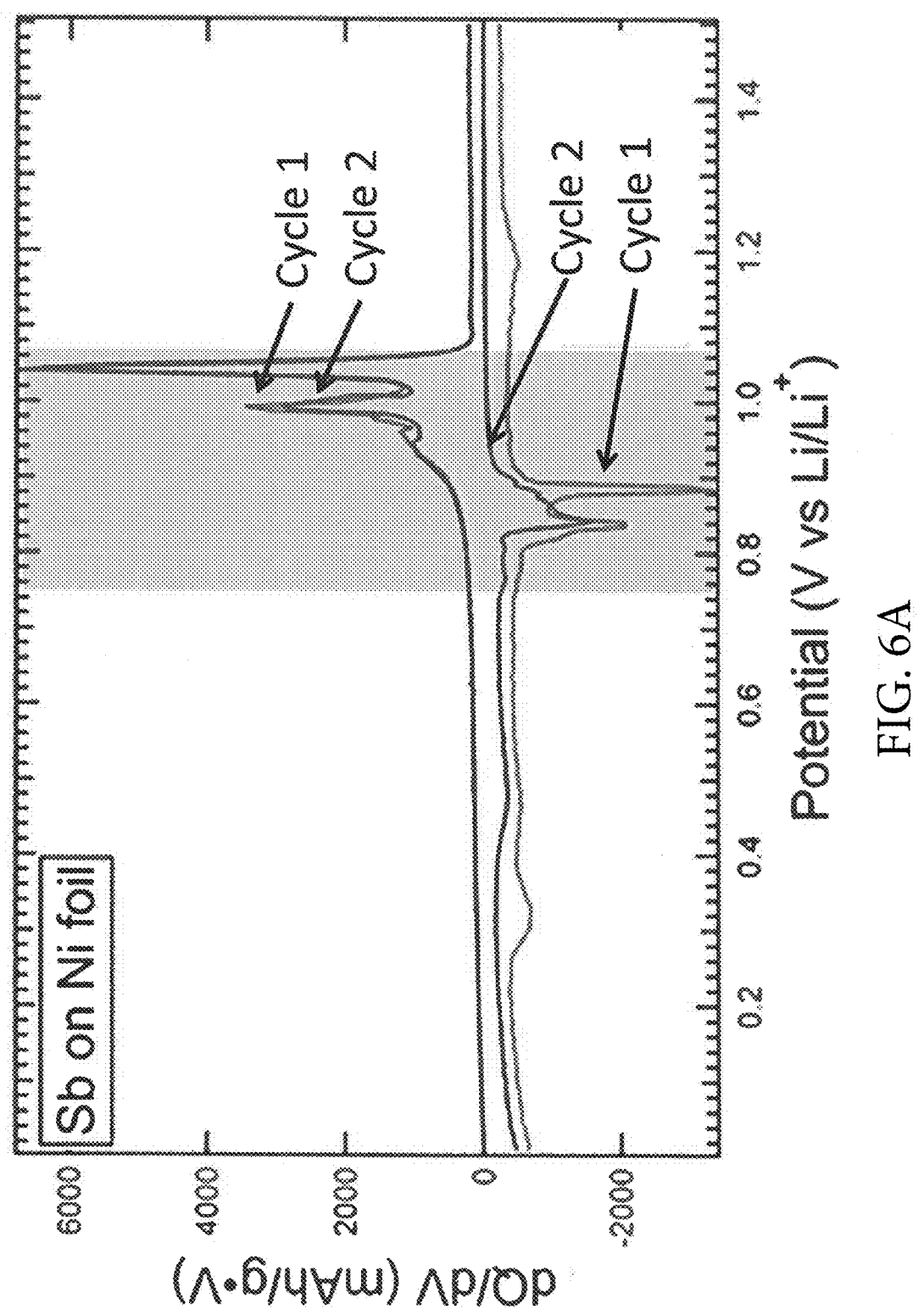
Figure 6B:
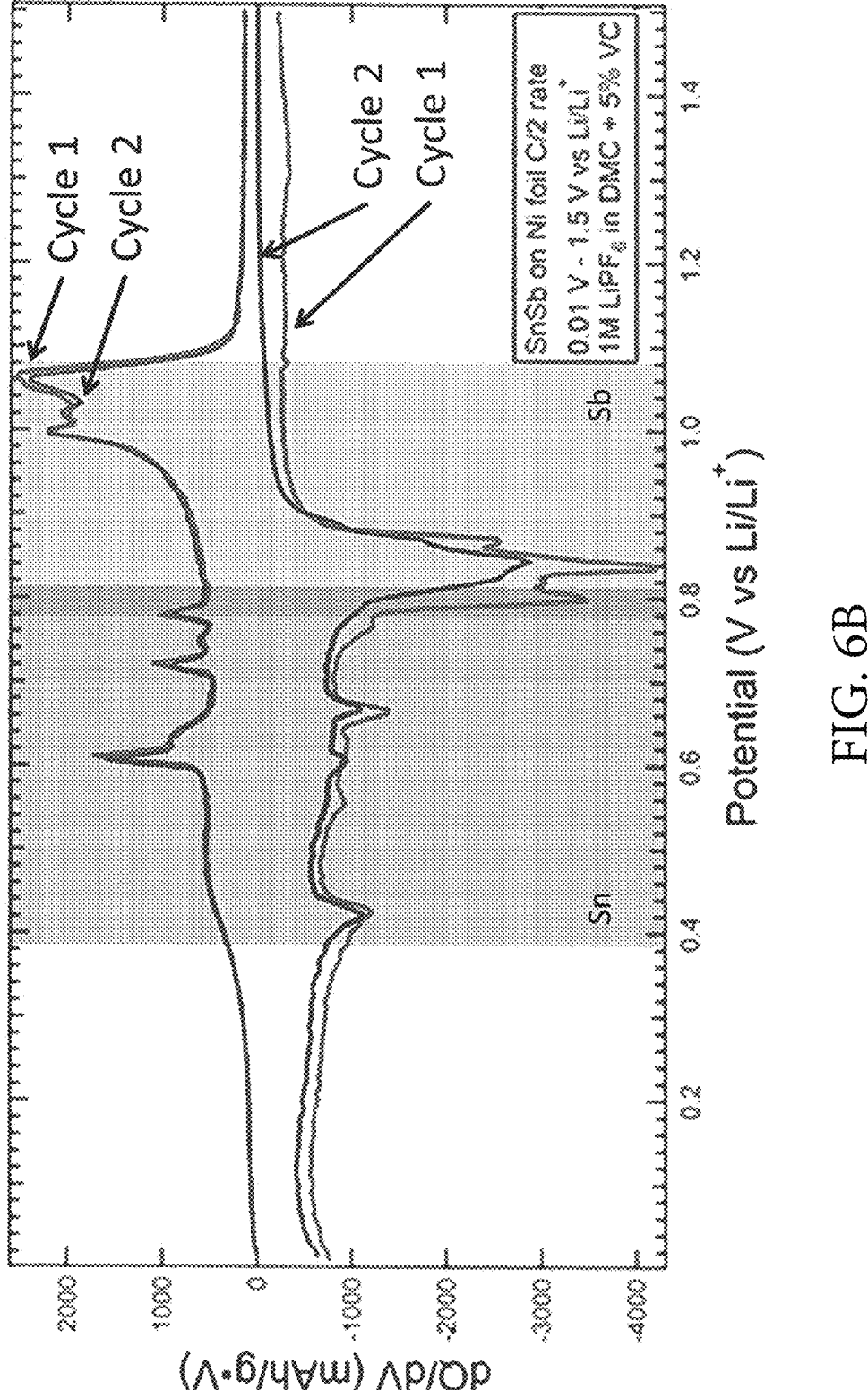
Figure 6C:
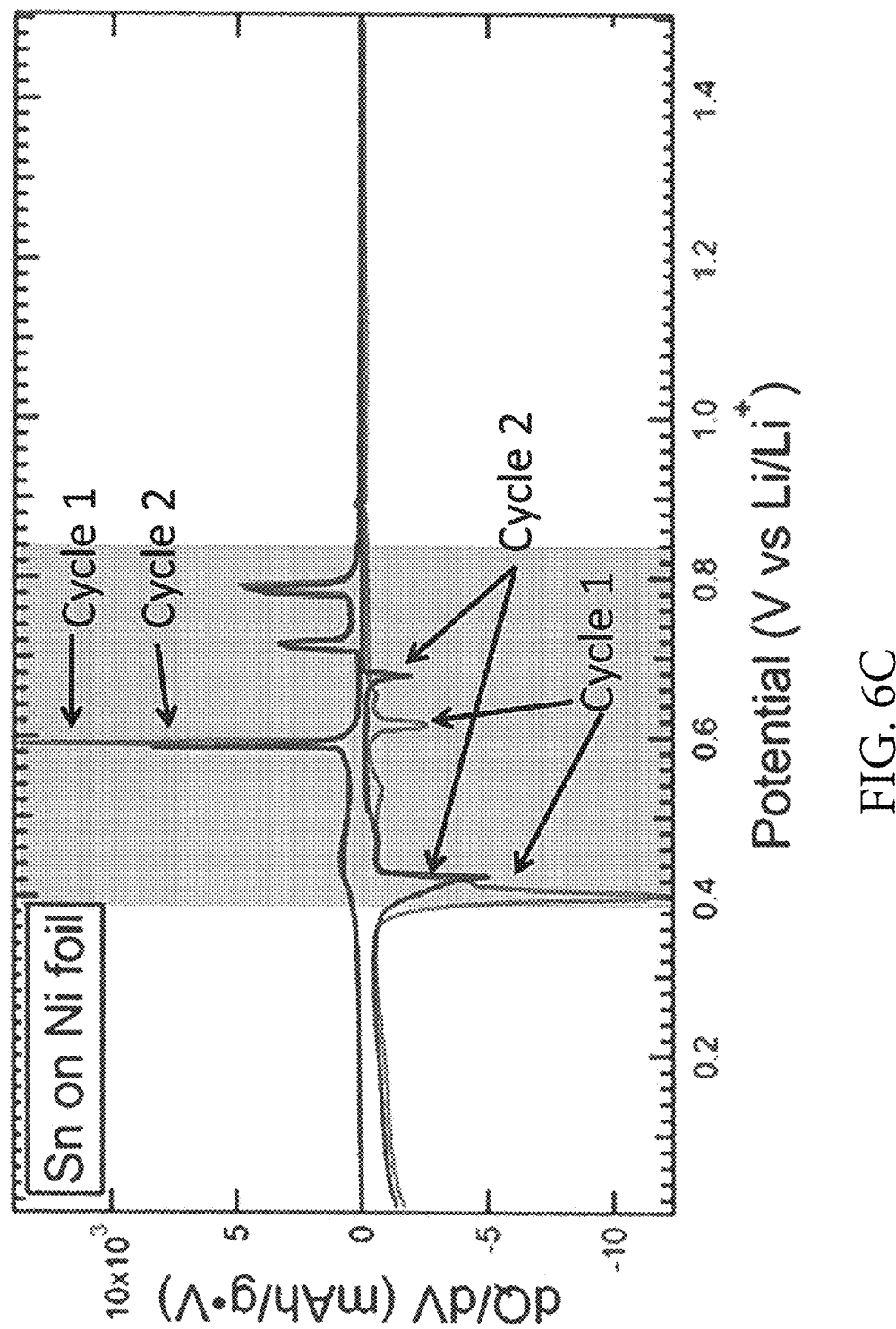
Figure 6D:
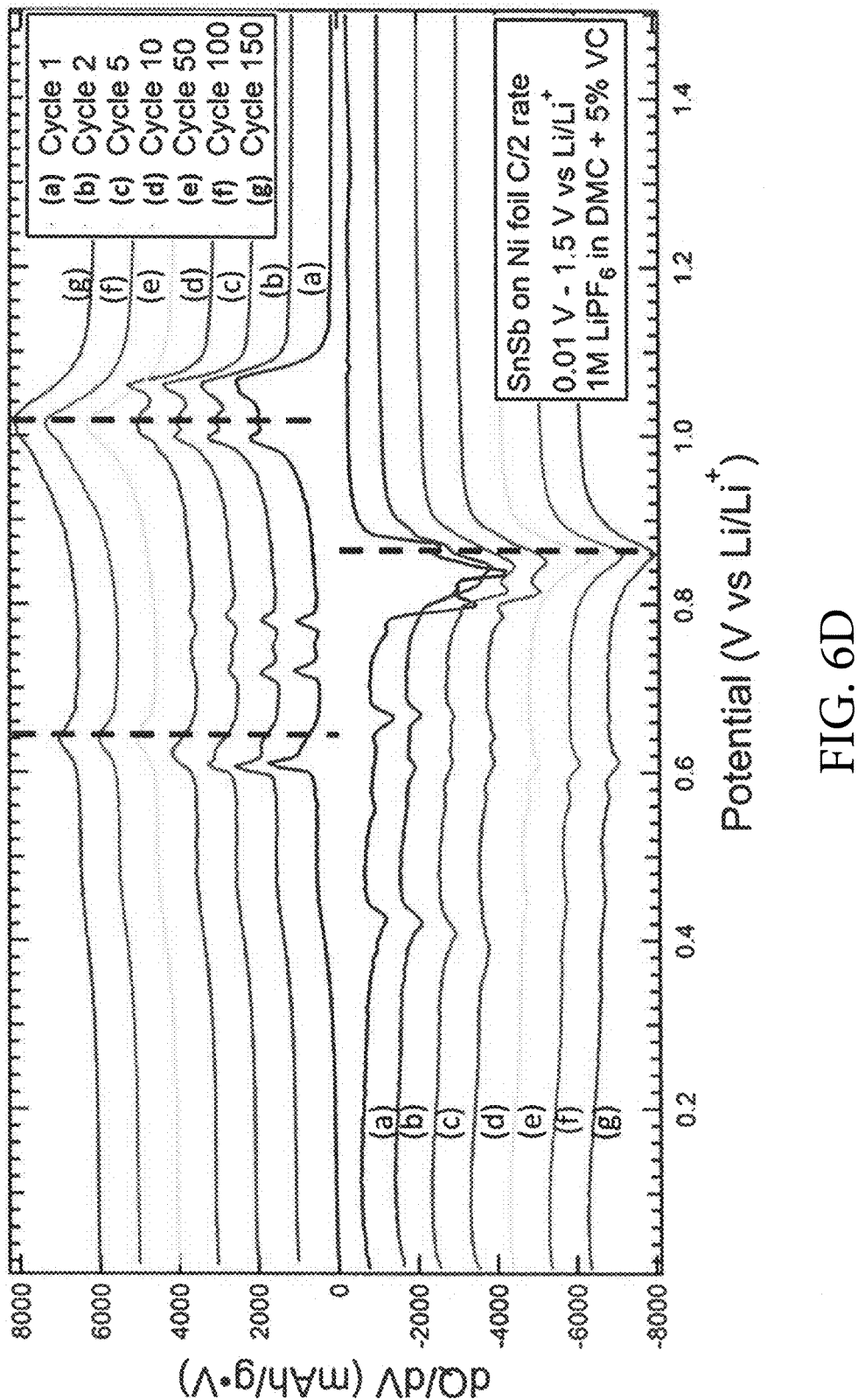
FIG. 6D is a graph of the differential capacity of SnSb galvanically cycled at a C/2 after its first, second, fifth, tenth, fiftieth, one hundredth, and one hundred and fiftieth cycles.

Electrochemical tests were conducted in half cells versus Lithium to understand the material's capacity, rate capability, and stability when compared to other Sn, Sb or impure Sn—Sb electrodeposited films. SnSb electrodeposited onto Ni foil was used as electrodes for these electrochemical tests, as opposed to the use of copper substrates, due to a previous study by the present inventors showing detrimental migration of copper into the active material. The electrochemical performance of the thin film SnSb as a sodium-ion anode was investigated using Swagelok half cells. A standard electrolyte of 1 M $LiPF_6$ in dimethyl carbonate (DMC) with 5% by weight vinylene carbonate (VC) was used for all tested cells. To study the cyclability of electrodeposited SnSb, the half cells were cycled at a C/2 rate between 0.01 V and 1.5 V vs $Li/Li^+$ as presented in FIGS. 5A and 5B. Electrodeposited Sn and Sb through ethaline solution at similar conditions were also electrochemically tested to compare to the SnSb synthesized. Over the 1000 cycles presented, SnSb was higher in overall capacity than both the Sb and Sn samples. SnSb combined the stability of Sb for long cycling with the higher theoretical capacity of Sn. SnSb does have an initial irreversible capacity loss of 35% when comparing the second cycle with the first cycle that is widely believe to be due to the initial formation of a solid electrolyte interface (SEI). The capacity retained is greater than 97% in subsequent cycles. When compared with the second cycle, with a gravimetric capacity of 757 mAh/g, the SnSb electrode does not lose 20% of its initial capacity until after 400 cycles (603 mAh/g at cycle 401).

Rate capability tests were performed to identify the capacities at which the material can operate at different charge densities. Electrodeposited SnSb was able to cycle versus lithium with specific gravimetric capacities of 693 mAh/g at C/2 rate, 690 mAh/g at 1C rate, 675 mAh/g at 2C rate, 660 mAh/g at 5C rate, 630 mAh/g at 10C rate, and 600 mAh/g at 20C rate. Returning to C/2 rate from the higher cycling rates at the end showed full capacity recovery and stability of the material in cycling at the higher rates.

Differential capacity graphs were derived from the galvanostatic cycling data; the differential capacity graphs are important for reviewing the electrochemical lithiation and deilthiation phases of the electrodeposited SnSb. Presented in FIGS. 6A-6D are the differential capacity graphs of electrodeposited SnSb, Sn, and Sb. The reactions between Sb and lithium, resulting in $Li_3Sb$, occurs between 0.8 V and 1.1 V vs $Li/Li^+$. Reactions between Sn and Lithium, forming $Li_{4.4}Sn$, appears between 0.4 V and 0.8 V vs $Li/Li^+$. The lithiation and delithiation of SnSb, involves the lithiation and delithiation events of both the individual Sn and Sb. Overall, cycling of SnSb results in the broadening of the electrochemical features in later cycles, related to the growing resistance from the uneven formation of SEI on the electrode surface.

Surface morphology during cycling, presented through ex-situ SEM images, visualizes the expected strain from multiple lithiation and delithiation events (FIGS. 7A and 7B). The surface of the pristine sample showed particles of 150 nm size. After the first lithiation and delithiation cycle, the SEM images reveal resulting smaller particle size of <100 nm. After 10 cycles, the surface of the electrode begins to reveal <100 nm width fractures. After 50 cycles, the surface presents more fractures present on the electrode. However, a different morphology is seen to form on the surface of the electrode that is less crystalline, suggesting formation of a strongly adhering SEI on the surface of the electrode.

Figure 7:
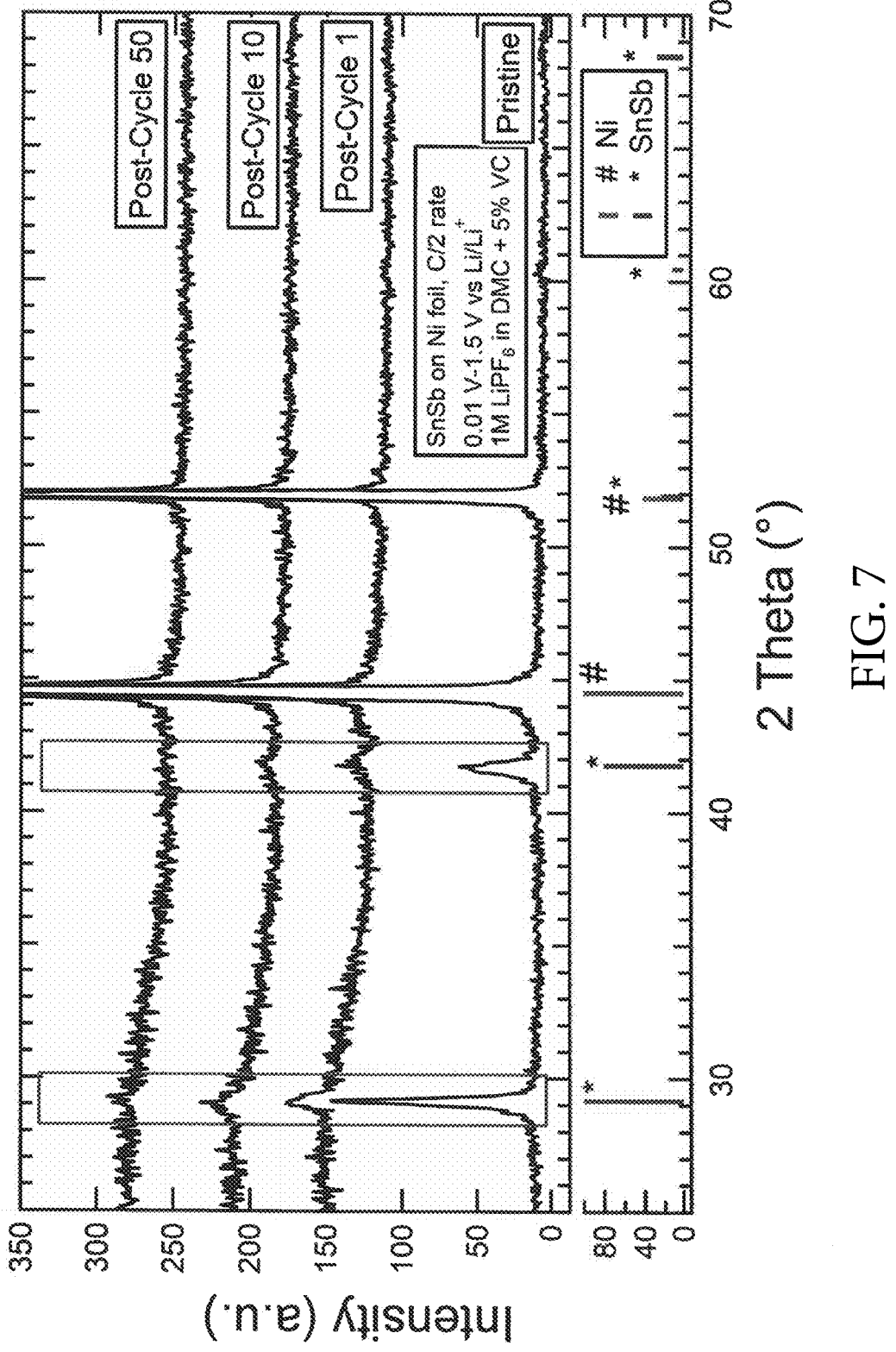
FIG. 7 shows XRD patterns of a Ni electrode surface for electrodeposited SnSb galvanostatically cycled at C/2 rate.

Ex-situ XRD was performed concurrently with the ex-situ SEM to study the changes in crystallinity over cycling (FIG. 7). The identification of the features in the XRD is shown below the data. After the first lithiation and delithiation, crystalline SnSb is seen to be present, verifying the reformation of SnSb after delithiation of the electrode material, as seen in previous SnSb studies. Further cycling of the electrode shows that the reformation still occurs up to cycle 50, but crystallinity decreases drastically. This loss of crystallinity is believed to be due to the loss of long range ordering of the crystalline material and formation of smaller crystallite sizes as a result of cycling.

Figure 8A:
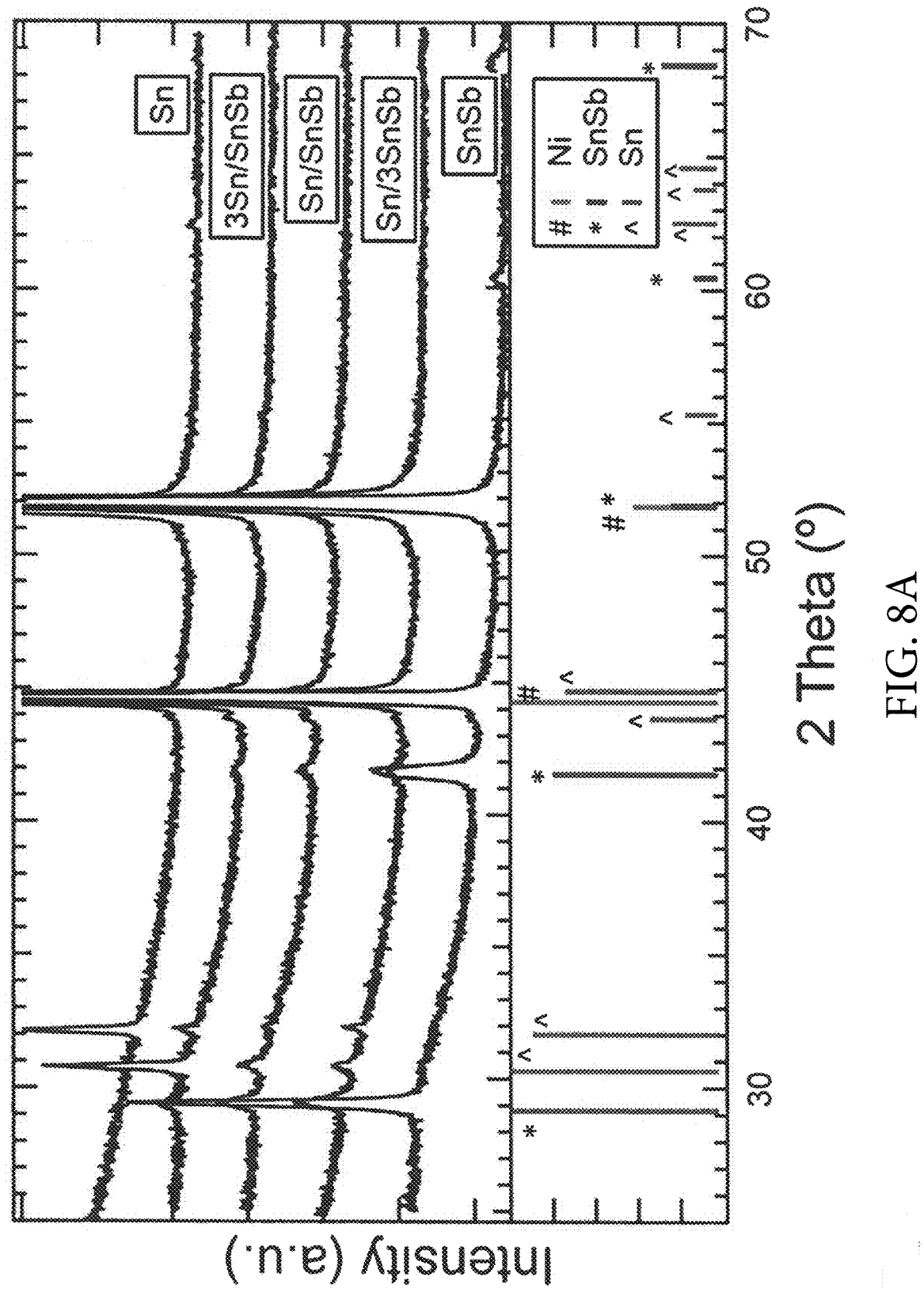
Figure 8B:
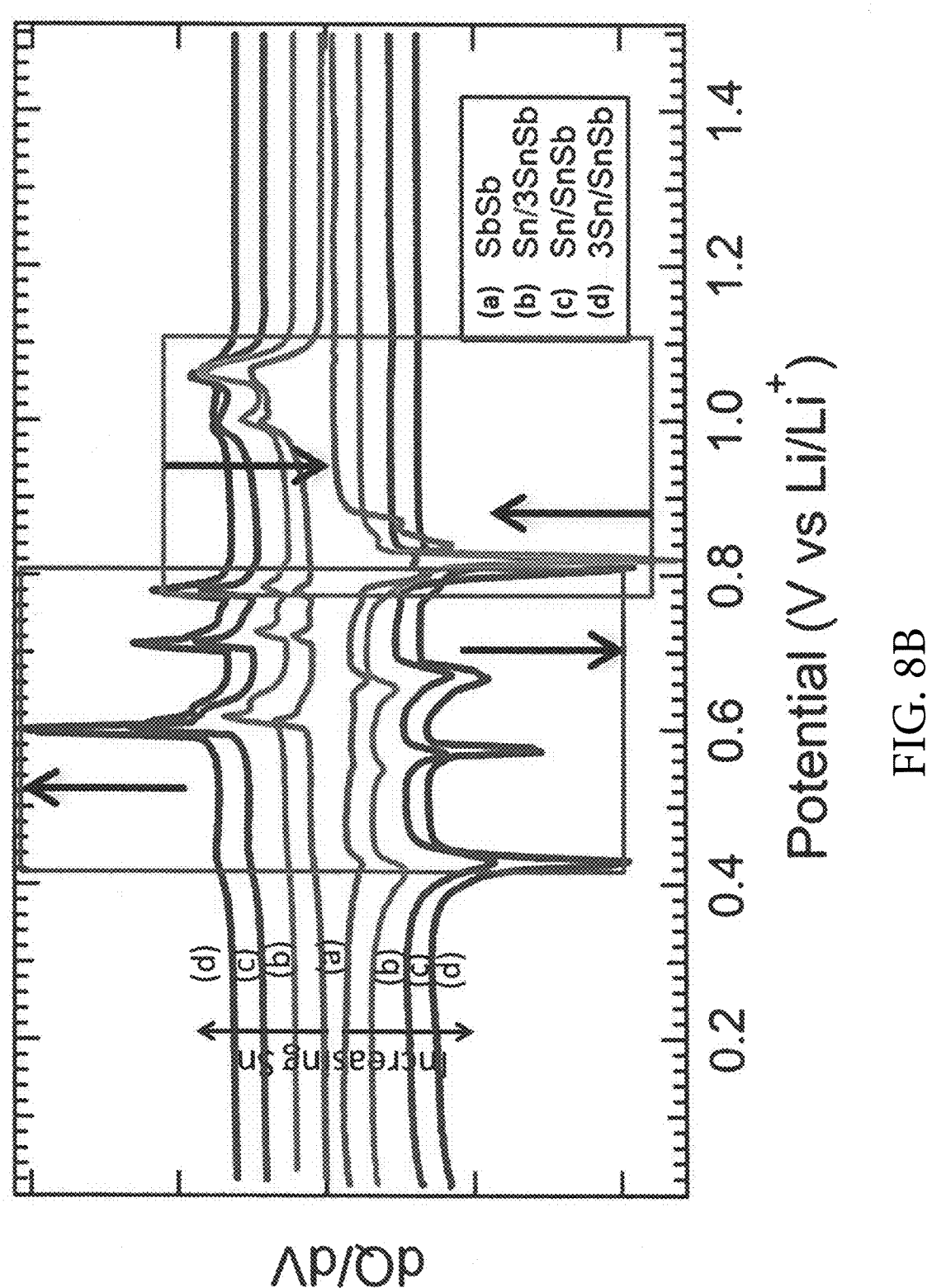

In order to compare the performance of pure SnSb produced in accordance with embodiments of the present invention to the impure production seen in previous reports, a controlled procedure for forming tin rich SnSb was developed. Using the same ethaline solvent, the impure and tin rich SnSb samples were intentionally synthesized containing concentrations equal to the targeted Sn:Sb ratios. Increasing the Sn content past the 1:1 Sn:Sb ratio results in the production of crystalline tin, as shown by XRD in FIG. 8A, with identification of the features shown below the data. Also presented through the XRD patterns is the continuous increase in intensity of crystalline tin as deposition from higher concentration of tin solution is performed. Using SEM-EDS, the composition of the electrode created was verified to be in similar ratio as the targeted solution concentration. The introduction of tin into the system can be monitored using differential capacity plots within the range at which tin and antimony lithiate (FIG. 8B). As stated above, the lithiation and delithiation of SnSb is a combination of the different phases both individual Sn and Sb goes through in a lithium cell. As the Sn content present is increased to artificially mimic the impure production, an evident increase in activity of Sn lithiation and delithiation is present. Conversely, due to the decrease of Sb content in the overall cell, dQ/dV is visibly decreased related to the Sb lithiation and delithiation. The purity of SnSb and successful introduction of tin into the system has also been verified in the differential capacity plots shown above for SnSb as a Na-ion anode.

Figure 8C:
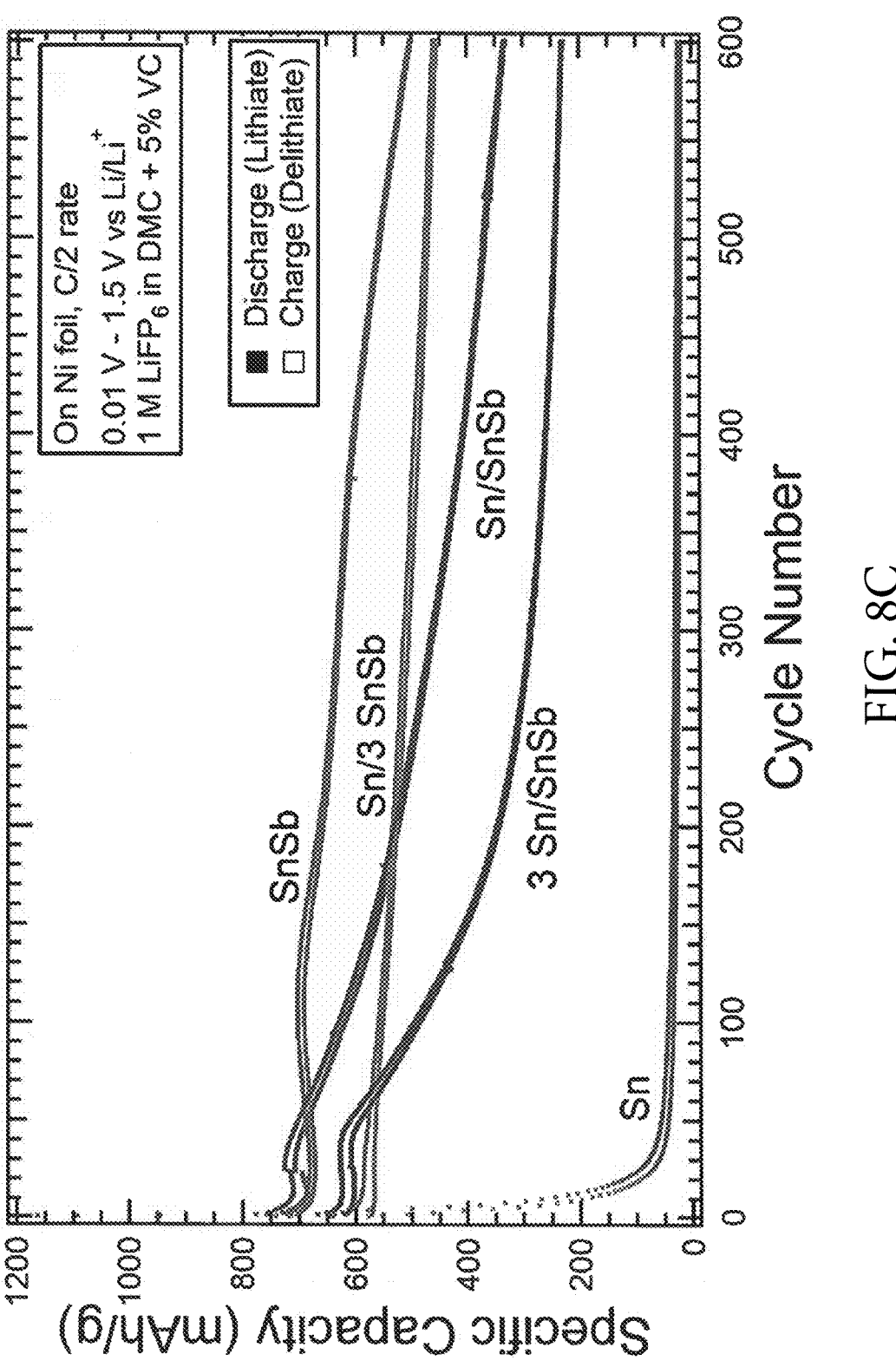
Figure 8D:
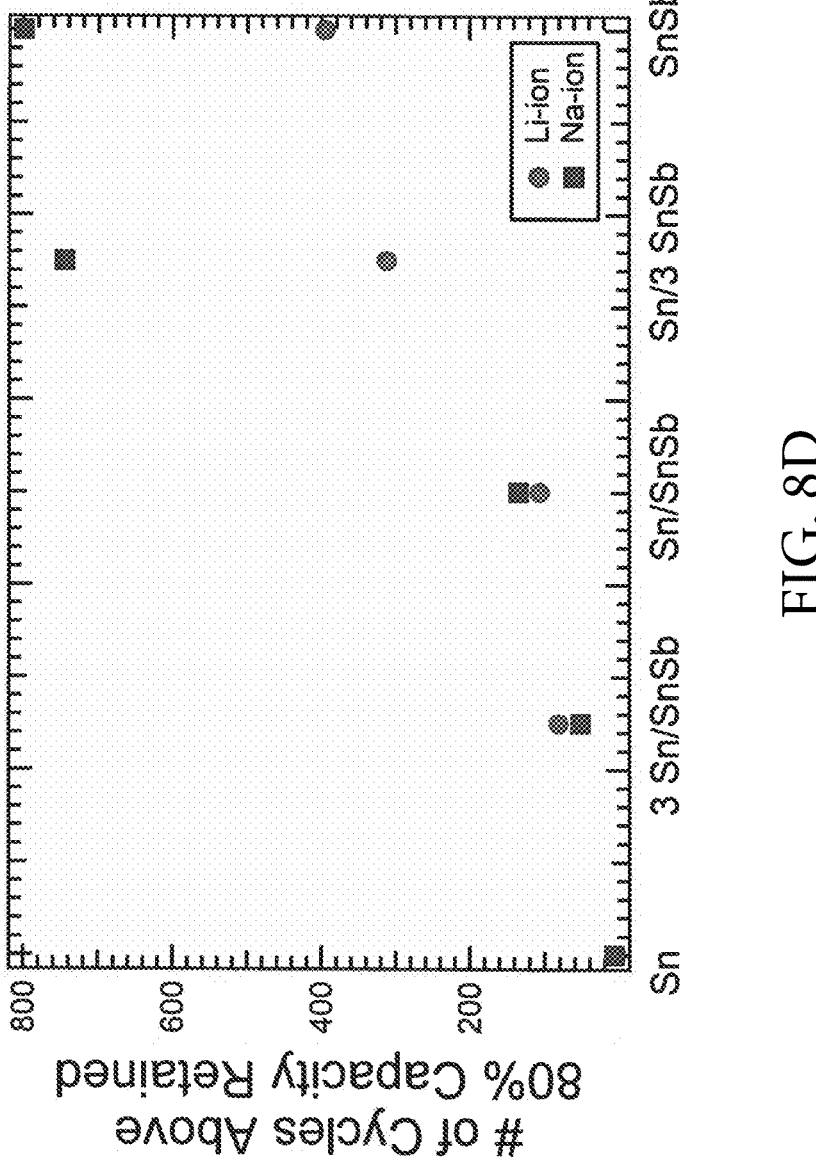

Testing of the tin rich SnSb electrodes is important as it presents the importance of purity of SnSb to the stability of the system. FIG. 8C presents the galvanostatic cycling of the different ratio of Sn:SnSb electrodeposited electrodes between 0.01 V and 1.5 V vs Li/Li$^+$ at C/2 rate. Artificially made impure SnSb samples containing higher Sn content resulted in a large decrease of capacity in the first 200 cycles (>10% capacity lost within 200 cycles). Pure tin had the highest initial capacity loss with 94% in 200 cycles, while SnSb had the lowest initial capacity loss with 7% after 200 cycles. Of the tin rich SnSb electrodes, 1:3 Sn:SnSb had 13% capacity loss, 1:1 Sn:SnSb had 19% capacity loss, and 3:1 Sn:SnSb had loss 26% of its capacity in 200 cycles. This huge initial drop may be due to the large volumetric expansion and instability of the crystalline Sn regions present in the film. Eventually, the capacity decrease diminishes in later cycles (>200) for tin rich samples, with the coulombic efficiency increasing per cycle. The later more stable cycling of tin rich SnSb electrodes may be related to the SnSb regions left behind. The slow decrease in capacity during this state of cycling may be related to the slow growth of SEI on newly exposed surfaces. FIG. 8D summarizes at what point each electrode falls below 80% capacity retention, with respect to the second cycle. With increasing Sn impurity present, the Sn—Sb electrode begins to fall below this benchmark at earlier cycles. Reformation of SnSb in lithium system has been shown in previous literature. While the phases during insertion are different, recent studies on the reformation of SnSb when tested against sodium has verified synergistic effects of SnSb reformation on the cycle life of the material. The reformation of SnSb may have some benefits in mitigating overall stress and expansion during lithiation/delithiation that pure Sn does not have.

In summary, by using an ethaline-based solution the electrodeposition of pure phase SnSb has been shown. Electrodeposited SnSb, without binders and carbon additives, was tested as a sodium-ion battery anode. While long-term cycling studies over 200 cycles have rarely been previously reported in SnSb literature, the present inventors report 1000 cycles to better understand the lifetime and long cycling stability of our SnSb electrodes. Although capacity below theoretical maximum was obtained from galvanostatic cycling at C/2 rate, SnSb exhibited high cycling stability, falling below 80% capacity retained after 800 cycles. Rate capability tests demonstrated the stability of SnSb cycling with higher current densities. Differential capacity plots and ex-situ XRD reveal the gradual change, instead of an immediate change as seen from previous reports, from crystalline SnSb to an amorphous phase for electrodeposited SnSb during C/2 cycling. The differential capacity plots also verify the purity of SnSb with absence of distinct Sn electrochemical events. Some structural integrity has been observed with the reformation of SnSb, which may be related to the electrochemical stability seen. If the reformation is important to the stability of the material, purity of the material is important for obtaining longer cycle lifetime of the material. The films reported here are thin, but recently, the electrochemical performance of a similar thickness material, ~200 nm Sn, was electrodeposited on a 3D scaffold architecture, and that electrode had triple the areal loading of current slurry-based anodes.

The electrodeposited SnSb used as a Li-ion battery anode, showed stability, only falling below 80% capacity retention after 400 cycle. In order to study the necessity of a pure phase electrodeposition process, samples were prepared containing tin rich products to mimic the impure production. Electrochemical data showed the negative effect on the electrode's cyclability as Sn content increases, showing the importance of purity on the lifetime of SnSb. Despite Sn ideally supplying higher energy density to the overall battery, the stress from the lithiation of impure regions of Sn in our electrodeposition is detrimental to the overall battery's performance and lifetime. Intrinsically, SnSb is found to help access the higher capacity Sn possesses, while minimizing the stress and expansion related to this process.

C. Effect of Water on Electrodeposition Products

Figure 9:
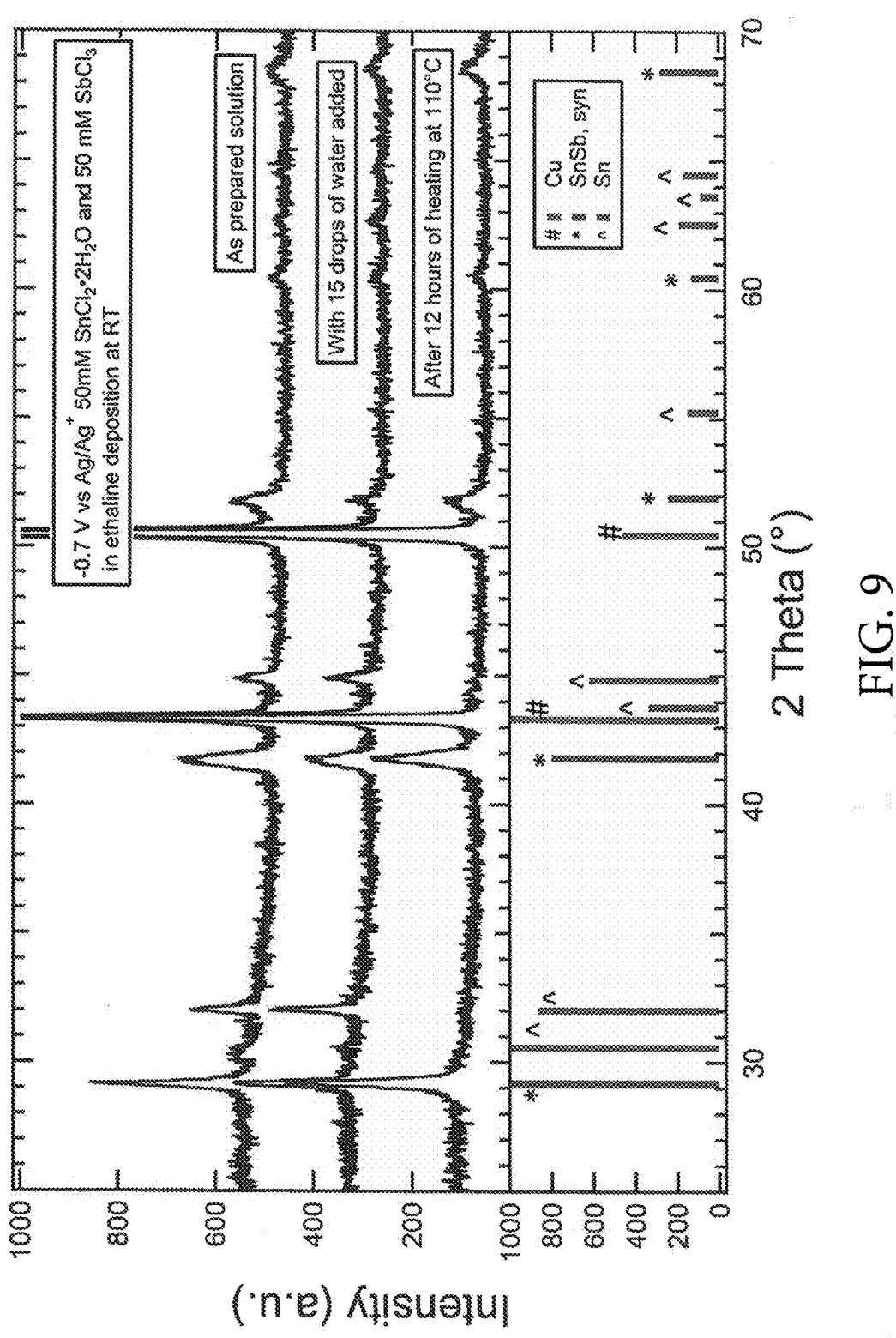
FIG. 9 shows XRD patterns of a Cu foil electrode surface for electrodeposited SnSb from an ethaline solution, as prepared, heated at 110° C., and after water was introduced into the solution.

The presence of water appears to affect the chemistry since both choline chloride and ethylene glycol precursors are hygroscopic. FIG. 9 shows XRD patterns of a Cu foil electrode surface for electrodeposited SnSb from an ethaline solution at −0.7 V vs Ag/Ag$^+$ for 300 s depositions from 50 mM SnCl$_2$·2H$_2$O and 50 mM SbCl$_3$ in ethaline solution as prepared, heated at 110° C., and after water was introduced into the solution. The species present are identified below the XRD data.

As may be observed, the electrodeposited product resulting from the as-prepared solution, containing Sb and Sn chloride dissolved in the ethaline solution produced using the as-obtained choline chloride and ethylene glycol mixture, crystalline SnSb is generated with a minor crystalline phase of Sn present. Heating the ethaline solution at 110° C. prior to electrodeposition, for driving off water that is present, resulted in the room temperature electrodeposition of pure crystalline SnSb.

To support the hypothesis that the Sn phase is caused by water collected by pristine, but hygroscopic, ethaline, water was introduced into the previously heated solution, resulting in the re-emergence of the minor, crystalline Sn phase. However, minimal humidity may be acceptable, as the chemistry in ethaline solvent does not change immediately when exposed to ambient room humidity and other conditions.

Additional control experiments were conducted to support the hypothesis that heating of the solution simply removes water, and does not cause changes to the reaction components. While unwanted moisture in the solution can be reduced by heating the ethaline solution to 110° C., excessive heating extended periods of time has a negative impact on the electrodeposited product. X-ray diffraction reveals the electrodeposition product at −0.7 V onto a nickel substrate using a solution heated for 3 days at 110° C. resulted in an amorphous product with an antimony-rich Sn to Sb composition. EDS revealed that after 3 days of heating at 110° C., there was a decrease in atomic ratio of the deposition from a 1 to 1 ratio of Sb to Sn to a 2.5 to 1 Sb Sn ratio. Further heating the solution for 4 days decreased the tin content of the deposition to 4.5 to 1 Sb to Sn.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for electrodeposition of SnSb on a substrate, comprising:

preparing a nonaqueous solution containing equimolar quantities of Sn(II) and Sb(III) salts in a nonaqueous solvent comprising a deep eutectic solvent;

inserting a conducting metal substrate into said nonaqueous solution;

applying a potential more negative than −0.55 V vs. Ag/Ag$^+$ to the conducting metal substrate at 25° C. for sufficient time to form a thin film of pure phase crystalline SnSb thereon; and heating said nonaqueous solution before said step of applying the potential for driving off water that is present.

2. The method of claim 1 wherein the deep eutectic solvent comprises ethaline.

3. The method of claim 1, wherein Sn(II) and Sb(III) salts comprise Sn(II) and Sb(III) chlorides.

4. The method of claim 1, wherein the conducting metal substrate comprises a nickel substrate.

5. The method of claim 4, wherein the applied potential is about −0.7 V vs. Ag/Ag$^+$.

6. The method of claim 1, wherein the salts of Sn(II) and Sb(III) are chosen from tin and antimony sulfates, citrate salts of tin and antimony, and salts of tin and antimony reactions with gluconic acid and tartaric acid.

7. A method for forming a high stability sodium-ion battery anode, comprising:

preparing a nonaqueous solution containing equimolar quantities of Sn(II) and Sb(III) salts, in a nonaqueous solvent comprising a deep eutectic solvent;

inserting a conducting metal substrate into said nonaqueous solution;

applying a potential more negative than −0.55 V vs. Ag/Ag$^+$ to the conducting metal substrate at 25° C. for sufficient time to form a thin film of pure phase crystalline SnSb thereon; and heating said nonaqueous solution before said step of applying the potential for driving off water that is present.

8. The method of claim 7 wherein the deep eutectic solvent comprises ethaline.

9. The method of claim 7, wherein Sn(II) and Sb(III) salts comprise Sn(II) and Sb(III) chlorides.

10. The method of claim 7, wherein the conducting metal substrate comprises a nickel substrate.

11. The method of claim 10, wherein the applied potential is about −0.7 V vs. Ag/Ag$^+$.

12. The method of claim 7, wherein the salts of Sn(II) and Sb(III) are chosen from tin and antimony sulfates, citrate salts of tin and antimony, and salts of tin and antimony reactions with gluconic acid and tartaric acid.

13. A method for forming a high stability lithium-ion battery anode, comprising:

preparing a nonaqueous solution containing equimolar quantities of Sn(II) and Sb(III) salts, in a nonaqueous solvent comprising a deep eutectic solvent;

inserting a conducting metal substrate into said nonaqueous solution;

applying a potential more negative than −0.55 V vs. Ag/Ag$^+$ to the conducting metal substrate at 25° C. for sufficient time to form a thin film of pure phase crystalline SnSb thereon; and heating said nonaqueous solution before said step of applying the potential for driving off water that is present.

14. The method of claim 13 wherein the deep eutectic solvent comprises ethaline.

15. The method of claim 13, wherein Sn(II) and Sb(III) salts comprise Sn(II) and Sb(III) chlorides.

16. The method of claim 13, wherein the conducting metal substrate comprises a nickel substrate.

17. The method of claim 16, wherein the applied potential is about −0.7 V vs. Ag/Ag$^+$.

18. The method of claim 13, wherein the salts of Sn(II) and Sb(III) are chosen from tin and antimony sulfates, citrate salts of tin and antimony, and salts of tin and antimony reactions with gluconic acid and tartaric acid.

* * * * *